US007949518B2

(12) United States Patent
Oshikiri

(10) Patent No.: US 7,949,518 B2
(45) Date of Patent: May 24, 2011

(54) HIERARCHY ENCODING APPARATUS AND HIERARCHY ENCODING METHOD

(75) Inventor: Masahiro Oshikiri, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1216 days.

(21) Appl. No.: 11/587,495

(22) PCT Filed: Apr. 22, 2005

(86) PCT No.: PCT/JP2005/007710
§ 371 (c)(1), (2), (4) Date: Oct. 26, 2005

(87) PCT Pub. No.: WO2005/106850
PCT Pub. Date: Nov. 10, 2005

(65) Prior Publication Data
US 2007/0233467 A1 Oct. 4, 2007

(30) Foreign Application Priority Data
Apr. 28, 2004 (JP) ................................ 2004-134519

(51) Int. Cl.
*G06F 15/00* (2006.01)
*G10L 11/00* (2006.01)
*G10L 11/06* (2006.01)
*G10L 19/14* (2006.01)

(52) U.S. Cl. ......................... 704/200; 704/208; 704/211

(58) Field of Classification Search .................. 704/200, 704/208, 211
See application file for complete search history.

(56) References Cited

U.S. PATENT DOCUMENTS 4,757,517 A * 7/1988 Yatsuzuka ..................... 375/245
5,054,075 A * 10/1991 Hong et al. ................... 704/226
5,388,209 A * 2/1995 Akagiri ......................... 704/229
5,479,517 A * 12/1995 Linhard ....................... 381/94.7
5,933,803 A * 8/1999 Ojala ............................ 704/223
6,757,648 B2 * 6/2004 Chen et al. .................... 704/203
(Continued)

FOREIGN PATENT DOCUMENTS

EP 1489399 12/2004
(Continued)

OTHER PUBLICATIONS

PCT International Search Report dated Aug. 9, 2005.
(Continued)

*Primary Examiner* — Eric Yen
(74) *Attorney, Agent, or Firm* — Dickinson Wright PLLC

(57) ABSTRACT

A hierarchy encoding apparatus capable of calculating appropriate delay amounts and also capable of suppressing increase in the bit rate. In this apparatus, a first layer encoding part (101) encodes the input signal of the n-th frame to produce a first layer encoded code. A first layer decoding part (102) generates a first layer decoded signal from the first layer encoded code and applies it to a delay amount calculating part (103) and a second layer encoding part (105). The delay amount calculating part (103) uses the first layer decoded signal and input signal to calculate the delay amount to be added to the input signal, and applies the calculated delay amount to a delay part (104). The delay part (104) delays the input signal by the delay amount applied from the delay amount calculating part (103) and then applied it to a second layer encoding part (105). The second layer encoding part (105) uses the first layer decoded signal and the input signal from the delay part (104) for encoding.

9 Claims, 25 Drawing Sheets

U.S. PATENT DOCUMENTS

| | | | | |
|---|---|---|---|---|
| 6,868,377 | B1 * | 3/2005 | Laroche | 704/205 |
| 7,130,797 | B2 * | 10/2006 | Beaucoup et al. | 704/233 |
| 7,356,748 | B2 * | 4/2008 | Taleb | 714/746 |
| 2004/0161043 | A1 | 8/2004 | Nomura et al. | |
| 2005/0163323 | A1 | 7/2005 | Oshikiri | |
| 2005/0252361 | A1 | 11/2005 | Oshikiri | |

FOREIGN PATENT DOCUMENTS

| | | |
|---|---|---|
| EP | 1533789 | 5/2005 |
| JP | 08046517 | 2/1996 |
| JP | 08263096 | 10/1996 |
| JP | 2001142496 | 5/2001 |
| JP | 2001142497 | 5/2001 |
| JP | 2003280694 | 10/2003 |
| JP | 2003323199 | 11/2003 |
| JP | 2004102186 | 4/2004 |
| WO | 03081196 | 10/2003 |
| WO | 2004023457 | 3/2004 |

OTHER PUBLICATIONS

T. Nomura, et al.; “MPEG-2 AAC o Mochiita Kaiso Lossless Asshuku Hoshiki,” The Institute of Electronics, Information and Communication Engineers 2002 Nen Sogo Taikai Koen Ronbunshu, Joho, System 1, Mar. 7, 2002, p. 179.

Supplementary European Search Report dated Jun. 1, 2007.

Ramprashad, S. A., “High Quality Embedded Wideband Speech Coding Using an Inherently Layered Coding Paradigm” Acoustics, Speech, and Signal Processing, 2000. ICASSP ’00. Proceedings. 2000 IEEE International Conference on Jun. 5-9, 2000, Piscataway, NJ, USA, IEEE, vol. 2, Jun. 5, 2000. pp. 1145-1148.

* cited by examiner

HIERARCHY ENCODING APPARATUS AND HIERARCHY ENCODING METHOD

TECHNICAL FIELD

The present invention relates to a hierarchical encoding apparatus and hierarchical encoding method.

BACKGROUND ART

A speech encoding technology that compresses speech signals at a low bit rate is important to use radio waves etc. efficiently in a mobile communication system. Further, in recent years, expectations for improvement of quality of communication speech have been increased, and it is desired to implement communication services with high realistic sensation. It is therefore not only desirable for a speech signal to become higher in quality, but also desirable to code signals other than speech such as an audio signal with a broader bandwidth with high quality.

An encoding technology is therefore required that is capable of achieving high quality when a radio wave reception environment is good, and achieving a low bit rate when the reception environment is inferior. In response to this requirement, an approach of hierarchically incorporating a number of encoding technologies to provide scalability shows promise. Scalability (or a scalable function) indicates a function capable of generating a decoded signal even from a part of an encoded code.

FIG. 1 is a block diagram showing a configuration for two-layer hierarchical encoding apparatus 10 as an example of hierarchical encoding (embedded encoding, scaleable encoding) apparatus of the related art.

Sound data is inputted as an input signal, and a signal with a low sampling rate is generated at down-sampling section 11. The down-sampled signal is then given to first layer encoding section 12, and this signal is coded. An encoded code of first layer encoding section 12 is given to multiplexer 17 and first layer decoding section 13. First layer decoding section 13 generates a first layer decoded signal based on the encoded code. Next, up-sampling section 14 increases the sampling rate of the decoded signal outputted from first layer decoding section 13. Delay section 15 then gives a delay of a predetermined time to an input signal. The first layer decoded signal outputted from up-sampling section 14 is then subtracted from the input signal outputted from delay section 15 to generate a residual signal, and this residual signal is given to second layer encoding section 16. Second layer encoding section 16 then codes the given residual signal and outputs an encoded code to multiplexer 17. Multiplexer 17 then multiplexes the first layer encoded code and the second layer encoded code to output as an encoded code.

Hierarchical encoding apparatus 10 is provided with delay section 15 that gives a delay of a predetermined time to an input signal. This delay section 15 corrects a time lag (phase difference) between the input signal and the first layer decoded signal. The phase difference corrected at delay section 15 occurs in filtering processing at down-sampling section 11 or up-sampling section 14, or in signal processing at first layer encoding section 12 or first layer decoding section 13. A preset predetermined fixed value (fixed sample number) is used as a delay amount for correcting this phase difference, that is, a delay amount used at delay section 15 (for example, refer to Patent Documents 1 and 2).

Patent Document 1: Japanese Patent Application Laid-open No. HEI8-46517.

Patent Document 1: Japanese Patent Application Laid-open No. HEI8-263096.

DISCLOSURE OF INVENTION

Problems to be Solved by the Invention

However, the phase difference to be corrected at the delay section changes over time according to an encoding method used at the first layer encoding section and a technique of processing carried out at the up-sampling section or down-sampling section.

For example, when a CELP (Code Excited Linear Prediction) scheme is applied to the first layer encoding section, various efforts are made to the CELP scheme so that auditory distortion cannot be perceived, and many of them are based on filter processing where phase characteristics change over time. These correspond, for example, to auditory masking processing at an encoding section, pitch emphasis processing at a decoding section, pulse spreading processing, post noise processing, and post filter processing, and they are based on filter processing where phase characteristics change over time. All of these processings are not applied to CELP, but these processing are applied to CELP more often in accordance with a decrease of bit rates.

These processings for CELP are carried out using a parameter indicating characteristics of an input signal, obtained at a given predetermined time interval (normally, frame unit). For a signal such as a speech signal in which characteristics change over time, the parameter also changes over time, and as a result, phase characteristics of a filter also change. As a result, a phenomena occurs where the phase of the first layer decoded signal changes over time.

Further, even with schemes other than CELP, phase difference may change over time even in up-sampling processing and down-sampling processing. For example, when an IIR type filter is used in a low pass filter (LPF) used in these sampling conversion processings, the characteristics of this filter are no longer linear phase characteristics. Therefore, when the frequency characteristics of an input signal change, phase difference also changes. In the case of an FIR type LPF having linear phase characteristics, the phase difference is fixed.

In this way, though phase difference to be corrected at a delay section changes over time, hierarchical encoding apparatus of the related art corrects phase difference by using a fixed amount of delay at the delay section, so that delay correction cannot be appropriately carried out.

FIG. 2 and FIG. 3 are views for comparing amplitude of a residual signal in the case where phase correction carried out by a delay section is appropriate and the case where phase correction carried out by a delay section is not appropriate.

FIG. 2 shows the residual signal in the case where phase correction is appropriate. As shown in this drawing, when phase correction is appropriate, by correcting the phase of the input signal by just sample D so as to match the phase of the first layer decoded signal, an amplitude value of the residual signal can be small. On the other hand, FIG. 3 shows the residual signal in the case where phase correction is not appropriate. As shown in the drawing, when phase correction is not appropriate, even if the first layer decoded signal is directly subtracted from the input signal, the phase difference is not corrected accurately, and therefore an amplitude value of the residual signal becomes large.

In this way, when phase correction carried out at the delay section is not appropriate, a phenomena occurs where the amplitude of the residual signal becomes large. In this case, an excessive number of bits are required in encoding at the second layer encoding section (when the phase difference between the input signal and first layer decoded signal is regarded as a problem). As a result, bit rates of the encoded code outputted from the second layer encoding section increase.

In order to simplify the description up to this point, a delay section that corrects phase difference between an input signal and a first layer decoded signal has been focused on to explain, but the situation is the same as in hierarchical encoding having three or more layers. Namely, when the phase difference to be corrected at the delay section changes over time and a fixed delay amount is used at the delay section, there is a problem that the bit rates of the encoded code outputted from a lower order layer encoding section increase.

It is therefore an object of the present invention to provide a hierarchical encoding apparatus and hierarchical encoding method capable of calculating an appropriate delay amount and suppressing an increase of bit rates.

Means for Solving the Problem

The hierarchical encoding apparatus of the present invention adopts a configuration comprising: an Mth layer encoding section that performs encoding processing in an Mth layer using a decoded signal for a layer of one order lower and an input signal; a delay section that is provided at a front stage of the Mth layer encoding section and gives a delay to the input signal; and a calculating section that calculates the delay given at the delay section every predetermined time from phase difference between the decoded signal for the layer of one order lower and the input signal.

Advantageous Effect of the Invention

According to the present invention, it is possible to calculate an appropriate delay amount and suppress an increase of bit rates.

BEST MODE FOR CARRYING OUT THE INVENTION

Embodiments of the present invention will be explained below in detail with reference to the accompanying drawings.

Embodiment 1

Figure 1:
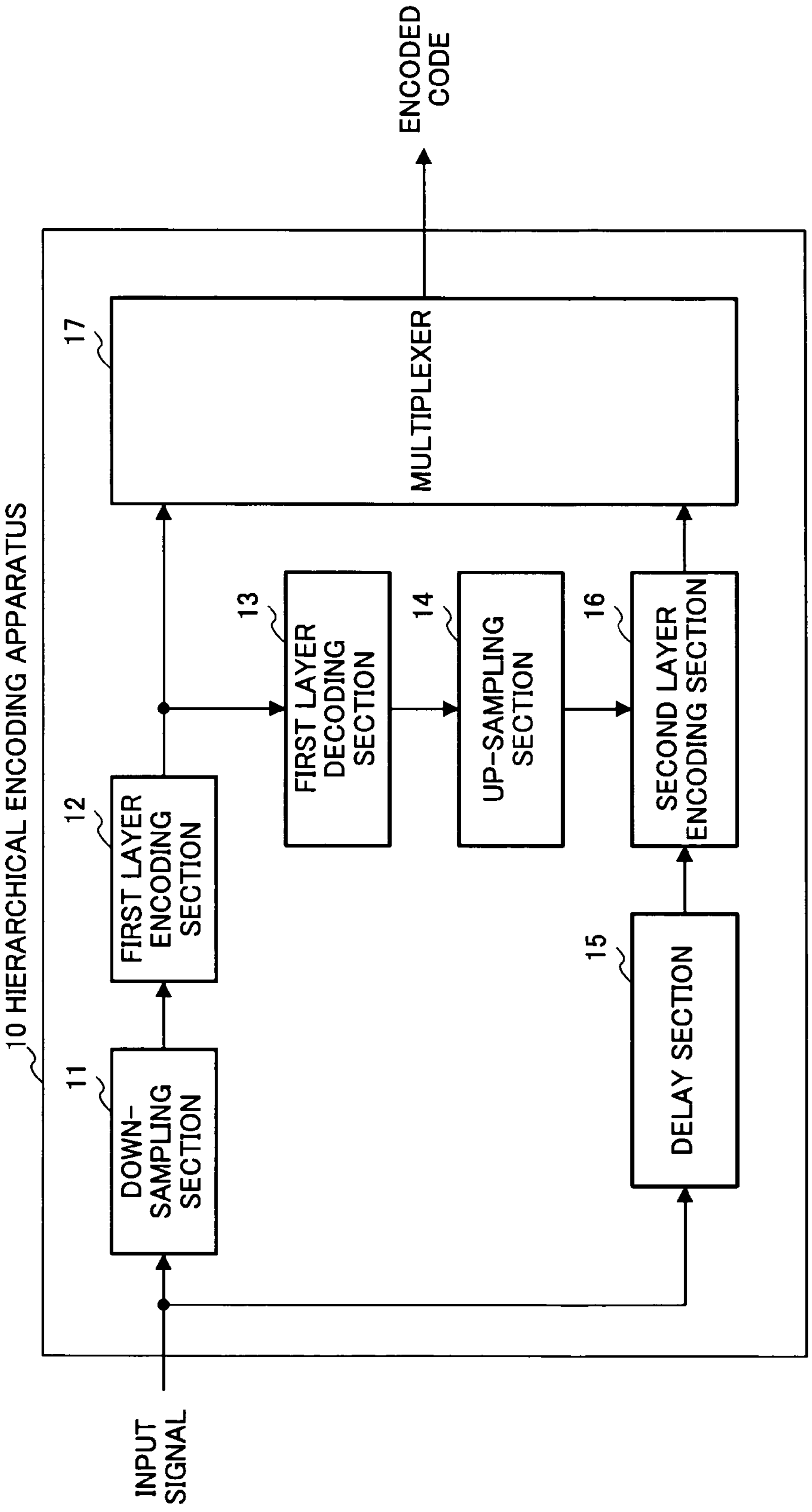
PRIOR ART FIG.1
FIG. 1 is a block diagram showing a configuration of a hierarchical encoding apparatus of the related art.
Figure 2:
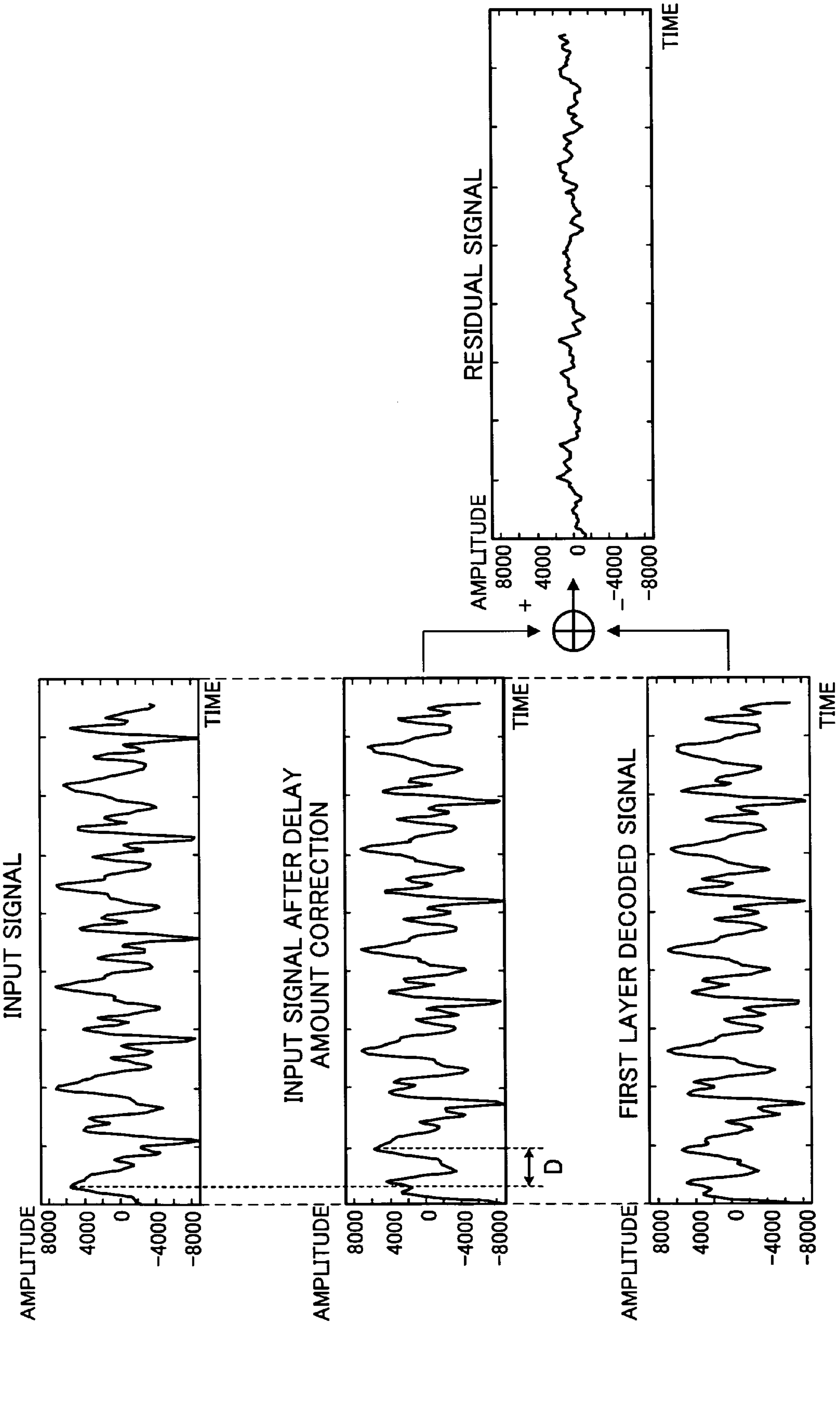
FIG. 2 shows a residual signal in a case where phase correction is appropriate.
Figure 3:
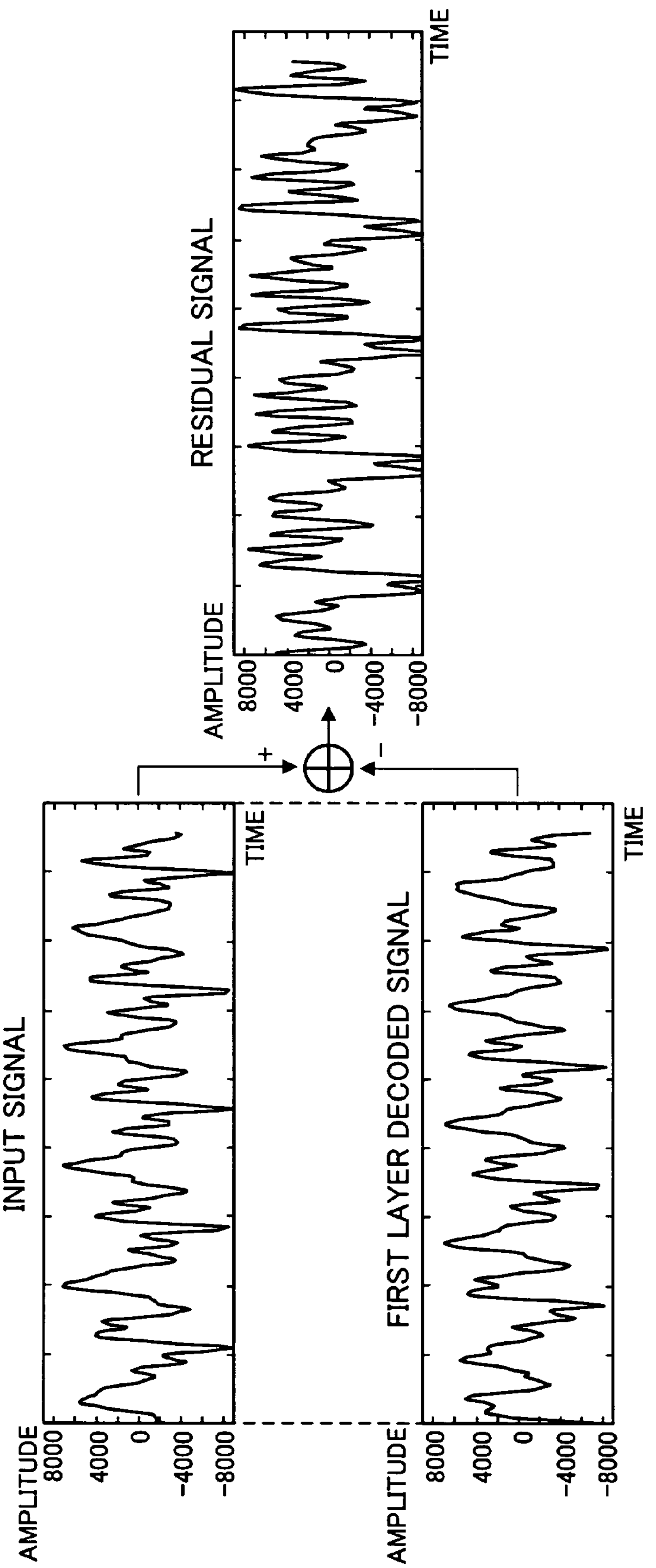
FIG. 3 shows a residual signal in a case where phase correction is not appropriate.
Figure 4:
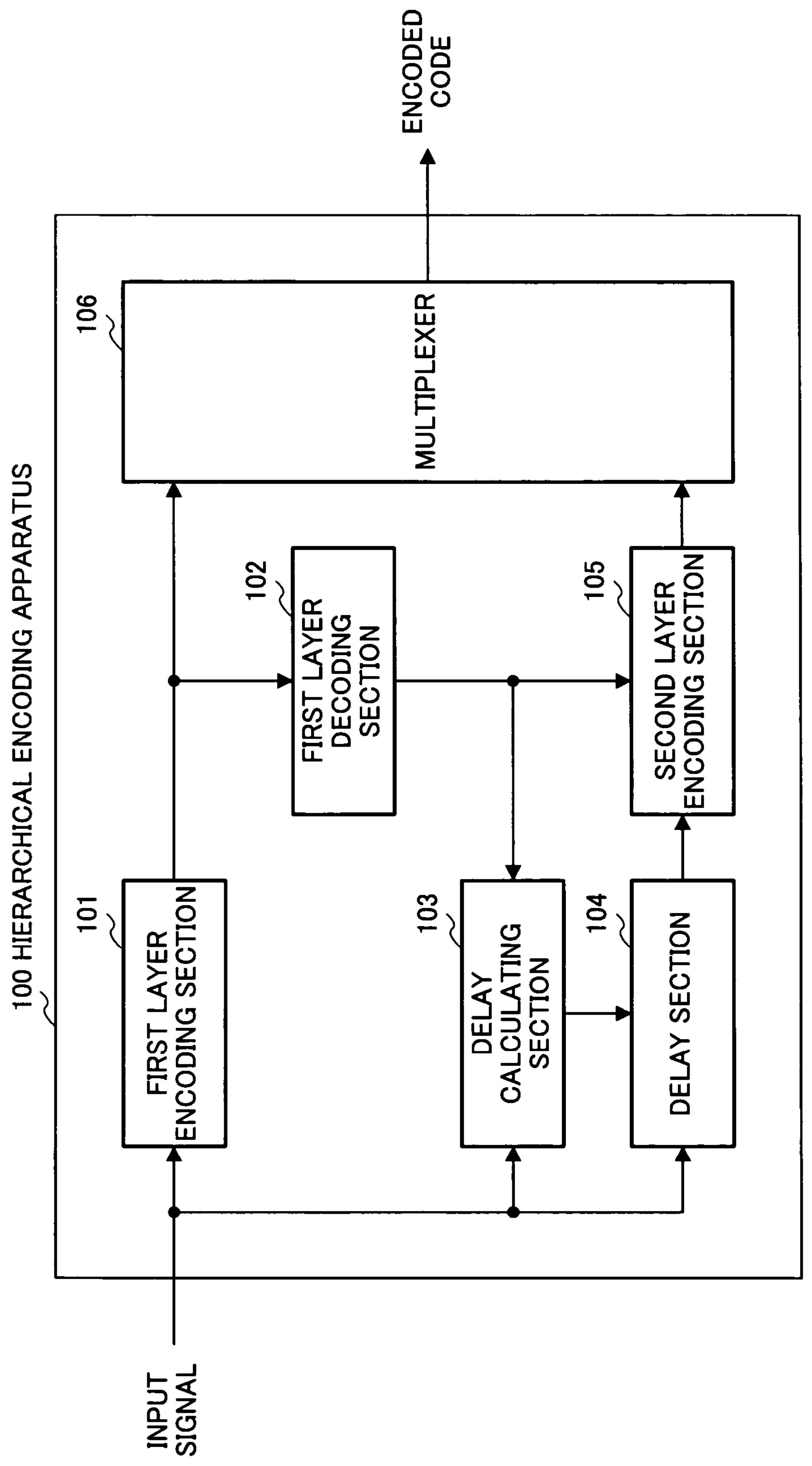
FIG. 4 is a block diagram showing the main configuration of a hierarchical encoding apparatus according to Embodiment 1.

FIG. 4 is a block diagram showing the main configuration of hierarchical encoding apparatus 100 according to Embodiment 1 of the present invention.

At hierarchical encoding apparatus 100, for example, sound data is inputted, the input signal is divided into a predetermined number of samples, put into frames, and given to first layer encoding section 101. When the input signal is s(i), a frame including the input signal of a range of $(n-1)\cdot NF \leqq i \leqq n\cdot NF$ is an nth frame. Here, NF indicates a frame length.

First layer encoding section 101 codes an input signal for an nth frame, gives a first layer encoded code to multiplexer 106 and first layer decoding section 102.

First layer decoding section 102 generates a first layer decoded signal from the first layer encoded code, and gives this first layer decoded signal to delay calculating section 103 and second layer encoding section 105.

Delay calculating section 103 calculates a delay amount to be given to the input signal using the first layer decoded signal and the input signal and gives this delay amount to delay section 104. The details of delay calculating section 103 will be described below.

Delay section 104 delays the input signal by just the delay amount given at delay calculating section 103 to give to second layer encoding section 105. When the delay amount given from delay calculating section 103 is D(n), the input signal given to second layer encoding section 105 is s(i−D (n)).

Second layer encoding section 105 carries out encoding using the first layer decoded signal and the input signal given from delay section 104 and outputs a second layer encoded code to multiplexer 106.

Multiplexer 106 multiplexes the first layer encoded code obtained at first layer encoding section 101 and the second layer encoded code obtained at second layer encoding section 105 to output as an encoded code.

Figure 5:
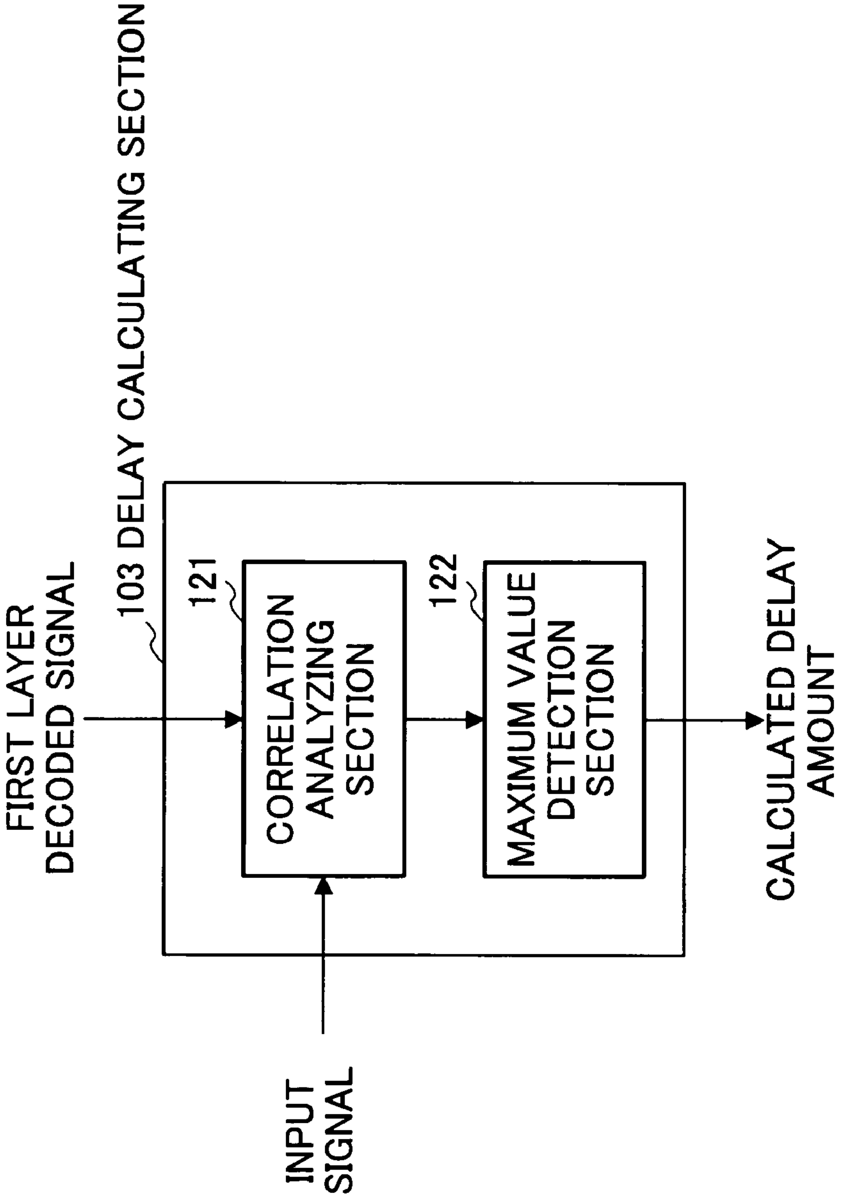
FIG. 5 is a block diagram showing the main configuration of a delay amount calculating section according to Embodiment 1.

FIG. 5 is a block diagram showing the main configuration of an internal part of delay calculating section 103.

Input signal s(i) and first layer decoded signal y(i) are inputted to delay calculating section 103. Both signals are given to correlation analyzing section 121.

Correlation analyzing section 121 calculates a cross-correlation value Cor(D) for input signal s(i) and first layer decoded signal y(i). Cross-correlation value Cor(D) is defined using (equation 1) below.

[Equation 1]

$$Cor(D) = \sum_{i=(n-1)\cdot FL}^{n\cdot FL-1} s(i-D)\cdot y(i) \tag{1}$$

Further, it is also possible to follow (equation 2) below normalized using the energy of each signal.

[Equation 2]

$$Cor(D) = \frac{\sum_{i=(n-1)\cdot FL}^{n\cdot FL-1} s(i-D)\cdot y(i)}{\sqrt{\sum_{i=(n-1)\cdot FL}^{n\cdot FL-1} s(i-D)^2}\cdot\sqrt{\sum_{i=(n-1)\cdot FL}^{n\cdot FL-1} y(i)^2}} \tag{2}$$

Here, D indicates a delay amount, and a cross-correlation value is calculated using the range of DMIN≦D≦DMAX. DMIN and DMAX indicate the minimum value and maximum value that can be taken by delay amount D.

Further, it is assumed to use a signal of a range of (n−1)·FL≦i<n·FL—a signal of the whole nth frame—in calculation of the cross-correlation value. The present invention is not limited to this, and it is possible to calculate a cross-correlation value using a signal longer or shorter than the frame length.

Further, a value where weighting w(D) expressed by a function of D is multiplied to the right side of (equation 1) or the right side of (equation 2) may be used as cross-correlation value Cor(D). In this case, (equation 1) and (equation 2) can be expressed by (equation 3) and (equation 4) below.

[Equation 3]

$$Cor(D) = w(D)\cdot\sum_{i=(n-1)\cdot FL}^{n\cdot FL-1} s(i-D)\cdot y(i) \tag{3}$$

[Equation 4]

$$Cor(D) = w(D)\cdot\frac{\sum_{i=(n-1)\cdot FL}^{n\cdot FL-1} s(i-D)\cdot y(i)}{\sqrt{\sum_{i=(n-1)\cdot FL}^{n\cdot FL-1} s(i-D)^2}\cdot\sqrt{\sum_{i=(n-1)\cdot FL}^{n\cdot FL-1} y(i)^2}} \tag{4}$$

Correlation analyzing section 121 then gives cross-correlation value Cor(D) calculated in this way to maximum value detection section 122.

Maximum value detection section 122 detects a maximum value out of cross-correlation value Cor(D) given from correlation analyzing section 121 and outputs delay amount Dmax (calculated delay amount) at that time.

Figure 6:
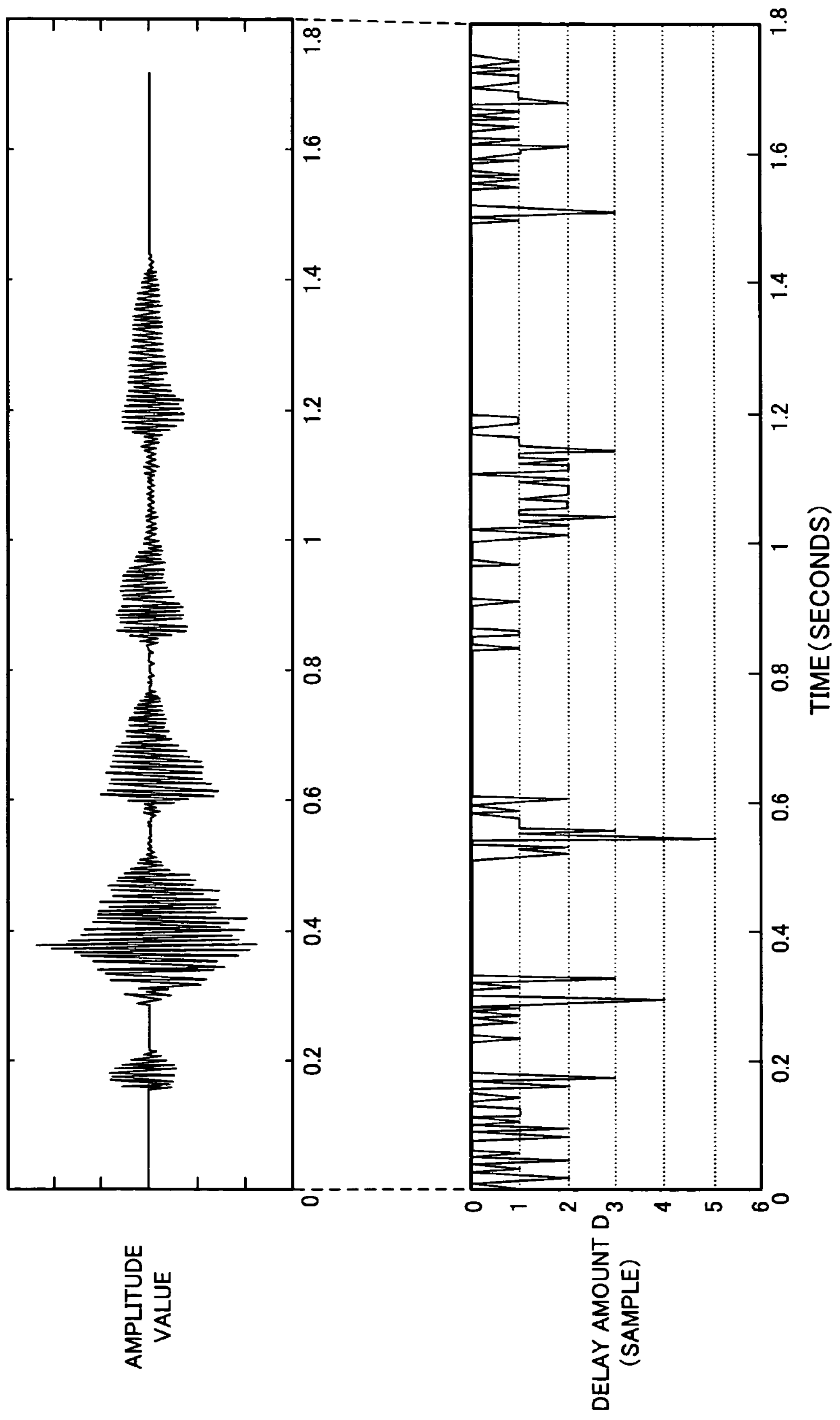
FIG. 6 shows the manner in which the delay amount Dmax changes when a speech signal is processed.

FIG. 6 shows the manner in which delay amount Dmax changes when a speech signal is processed. The upper part of FIG. 6 indicates an input speech signal, the horizontal axis indicates time, and the vertical axis indicates an amplitude value. The lower part of FIG. 6 indicates change in the delay amount calculated in accordance with the above-described (equation 2), with the horizontal axis indicating time and the vertical axis indicating delay amount Dmax.

The delay amount shown in the lower part of FIG. 6 indicates a relative value for a logical delay amount generated at first layer encoding section 101 and first layer decoding section 102. This drawing is made using an input signal sampling rate of 16 kHz and a CELP scheme at first layer encoding section 101. As shown in this drawing, it can be understood that the delay amount to be given to the input signal changes over time. For example, it can be understood from the parts of a time of 0 to 0.15 seconds and 0.2 to 0.3 seconds that delay amount D tends to fluctuate unstably at portions other than the voiced (no sound or background noise) portions.

According to this embodiment, in hierarchical encoding made up of two layers, delay calculating section 103 that dynamically calculates a delay amount (for each frame) using an input signal and a first layer decoded signal is provided. Second layer encoding section 105 then carries out second encoding using an input signal to which this dynamic delay has been given. As a result, the phase of the input signal and the phase of the first layer decoded signal can be made to match more accurately, so that it is possible to achieve reduction of the bit rates of the second layer encoding section 105.

Further, when described more generally, in this embodiment, in encoding of an Mth layer (where M is a natural number) of hierarchical encoding made up of a plurality of layers, a delay calculating section obtains a delay amount for each frame from an input signal and decoded signal of an M−1th layer, and delays the input signal in accordance with this delay amount. As a result, similarity (phase difference) between the input signal and the output signal of a lower order layer is improved, so that it is possible to reduce bit rates of an Mth layer encoding section.

In this embodiment, the case has been described as an example where a delay amount is calculated for each frame, but the delay amount calculation timing (calculation interval) is not limited for each frame and may be carried out based on a processing unit time of specific processing. For example, when the CELP scheme is used at the first layer encoding section, LPC analysis and encoding are normally carried out for each frame, and therefore calculation of the delay amount is also carried out for each frame.

Each components of above-described hierarchical encoding apparatus 100 will be described in detail below.

Figure 7:
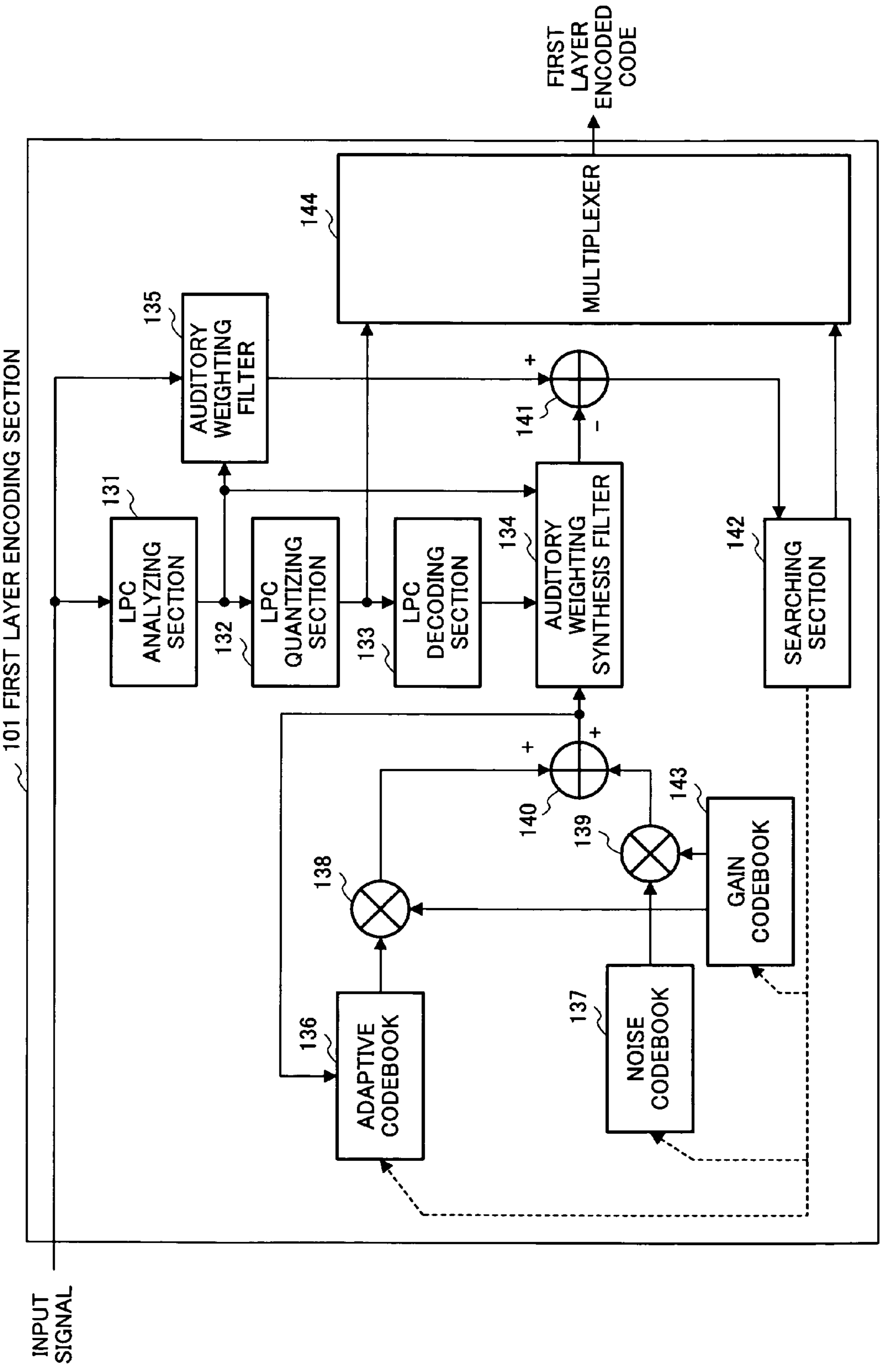
FIG. 7 shows a configuration when CELP is used in a first layer encoding section according to Embodiment 1.

FIG. 7 shows a configuration when CELP is used in first layer encoding section 101. Here, the case of using CELP is described, but the use of CELP at first layer encoding section 101 is not a requirement of the present invention and it is also possible to use other schemes.

LPC coefficients are obtained for the input signal at LPC analyzing section 131. The LPC coefficients are used in order to improve auditory quality and is given to auditory weighting filter 135 and auditory weighting synthesis filter 134. At the same time as this, the LPC coefficients are given to LPC quantizing section 132 and converted to parameters such as LSP coefficients appropriate for quantization at LPC quantizing section 132, and quantization is carried out. An encoded code obtained by this quantization is then given to multiplexer 144 and LPC decoding section 133. At LPC decoding section 133, quantized LSP coefficients are calculated from the encoded code and converted to LPC coefficients. In this way, quantized LPC coefficients are obtained. The quantized LPC coefficients are given to auditory weighting synthesis filter 134, and is used in encoding of adaptive codebook 136, adaptive gain, noise codebook 137, and noise gain.

This auditory weighting filter 135 is expressed by (equation 5) below.

[Equation 5]

$$W(z) = \frac{1 - \sum_{i=1}^{NP} \alpha(i) \cdot \gamma_{MA}^{i} \cdot z^{-i}}{1 - \sum_{i=1}^{NP} \alpha(i) \cdot \gamma_{AR}^{i} \cdot z^{-i}} \quad (5)$$

Here, $\alpha(i)$ represents LPC coefficients, NP is a number of the LPC coefficients, $\gamma_{AR}$, $\gamma_{MA}$ are parameters for controlling the strength of auditory weighting. The LPC coefficients are obtained in frame units so that the characteristics of auditory weighting filter 135 change for each frame.

Auditory weighting filter 135 assigns weight to an input signal based on the LPC coefficients obtained at LPC analyzing section 131. This is carried out with the object of carrying out spectrum re-shaping so that a spectrum of quantization distortion is masked by the spectrum envelope of the input signal.

Next, a method for searching an adaptive vector, adaptive vector gain, noise vector, and noise vector gain will be described.

Adaptive codebook 136 holds an excitation signal generated in the past as an internal state, and is capable of generating an adaptive vector by repeating this internal state at a desired pitch period. Between 60 Hz to 400 Hz is appropriate as a range of the pitch period. Further, a noise vector stored in advance in a storage region or a vector without having a storage region as with an algebraic structure and generated in accordance with a specific rule, is outputted from noise codebook 137 as a noise vector. An adaptive vector gain to be multiplied with an adaptive vector and a noise vector gain to be multiplied with a noise vector are outputted from gain codebook 143, and the gains are multiplied with the vectors at multiplier 138 and multiplier 139. At adder 140, an excitation signal is generated by adding the adaptive vector multiplied with the adaptive vector gain and the noise vector multiplied with the noise vector gain, and given to auditory weighting synthesis filter 134. The auditory weighting synthesis filter is expressed by (equation 6) below.

[Equation 6]

$$H_w(z) = \frac{W(z)}{1 - \sum_{i=1}^{NP} \alpha'(i) \cdot z^{-i}} \quad (6)$$

Here, $\alpha'(i)$ indicates the quantized LPC coefficients.

The excitation signal is passed through auditory weighting synthesis filter 134 to generate an auditory weighting synthesis signal, and this signal is given to subtractor 141. Subtractor 141 subtracts the auditory weighting synthesis signal from the auditory weighting input signal and gives the subtracted signal to searching section 142. Searching section 142 efficiently searches combinations of an adaptive vector, adaptive vector gain, noise vector and noise vector gain in which distortion defined from the subtracted signal is a minimum, and transmits these encoded codes to multiplexer 144. In this example, regarding as the vectors having the adaptive vector gain and noise vector gain as elements, a configuration is shown where both are decided at the same time. However, this method is by no means limiting, and a configuration where the adaptive vector gain and noise vector gain are decided independently is also possible.

After all indexes are decided, the indexes are multiplexed at multiplexer 144, and an encoded code is generated and outputted. An excitation signal is calculated using the index at that time and given to adaptive codebook 136 to prepare for the next input signal.

Figure 8:
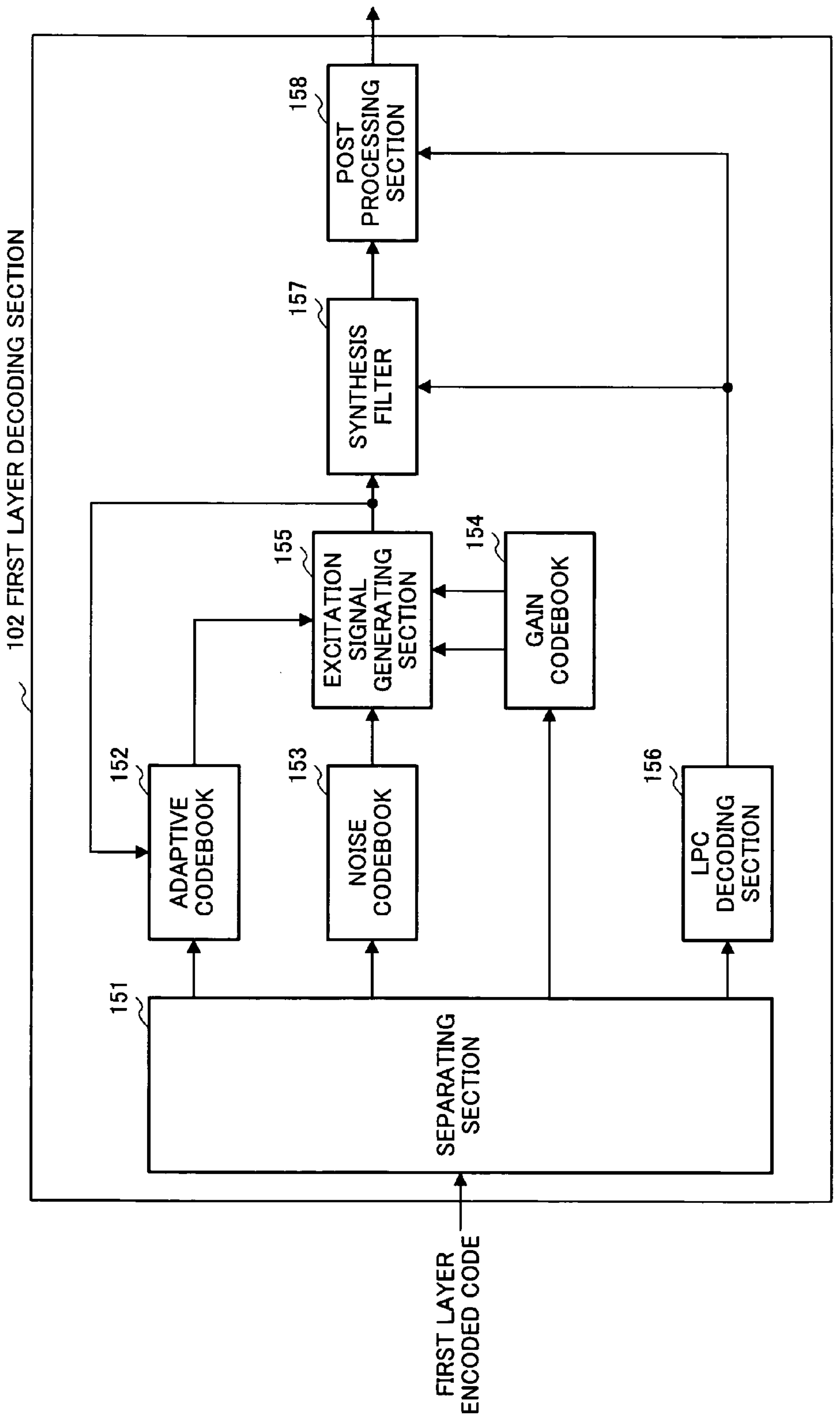
FIG. 8 shows a configuration of a first layer decoding section according to Embodiment 1.

FIG. 8 shows a configuration for first layer decoding section 102 when CELP is used at first layer encoding section 101. First layer decoding section 102 has a function for generating a first layer decoded signal using the encoded code obtained at first layer encoding section 101.

The encoded code is then separated from the inputted first layer encoded code at separating section 151, and given to adaptive codebook 152, noise codebook 153, gain codebook 154 and LPC decoding section 156. At LPC decoding section 156, the LPC coefficients are decoded using the given encoded code and given to synthesis filter 157 and post processing section 158.

Next, adaptive codebook 152, noise codebook 153 and gain codebook 154 respectively decode adaptive vector q(i), noise vector c(i), adaptive vector gain $\beta_q$, and noise vector gain $\gamma_q$ using the encoded code. Gain codebook 154 may be expressed as vectors having the adaptive vector gain and noise gain vector as elements, or may be in the form of holding the adaptive vector gain and noise vector gain as independent parameters, depending on the configuration of the gain of first layer encoding section 101.

Excitation signal generating section 155 multiplies the adaptive vector by the adaptive vector gain, multiplies the noise vector by the noise vector gain, adds the multiplied signals, and generates an excitation signal. When the excitation signal is expressed as ex(i), the excitation signal ex(i) can be obtained as (equation 7) below.

[Equation 7]

$$ex(i) = \beta_q \cdot q(i) + \gamma_q \cdot c(i) \quad (7)$$

The above-described excitation signal is subjected to signal processing as post processing in order to improve subjective quality. This may correspond, for example, to pitch emphasis processing for improving sound quality by emphasizing periodicity of a periodic signal, pulse spreading processing for reducing the noisiness of a pulsed excitation signal, and smoothing processing for reducing unnecessary energy fluctuation of a background noise portion. This kind of processing is implemented based on time varying filter processing, and therefore causes the phenomena that phase of an output signal fluctuates.

Next, synthesis signal syn(i) is generated in accordance with (equation 8) below at synthesis filter 157 using the decoded LPC coefficients and excitation signal ex(i).

[Equation 8]

$$syn(i) = ex(i) + \sum_{j=1}^{NP} \alpha_q(j) \cdot syn(i-j) \tag{8}$$

Here, $\alpha_q$(j) represents the decoded LPC coefficients and NP is a number of the LPC coefficients. Decoded signal syn(i) decoded in this manner is then given to post processing section 158.

There are cases where post processing section 158 applies post filter processing for improving auditory sound quality, or post noise processing for improving quality at the time of background noise. This kind of processing is implemented based on time varying filter processing, and therefore causes the phenomena that phase of an output signal fluctuates.

Here, configuration where first layer decoding section 102 includes post processing section 158 has been described as an example, but it is also possible to adopt a configuration not having this kind of post processing section.

Figure 9:
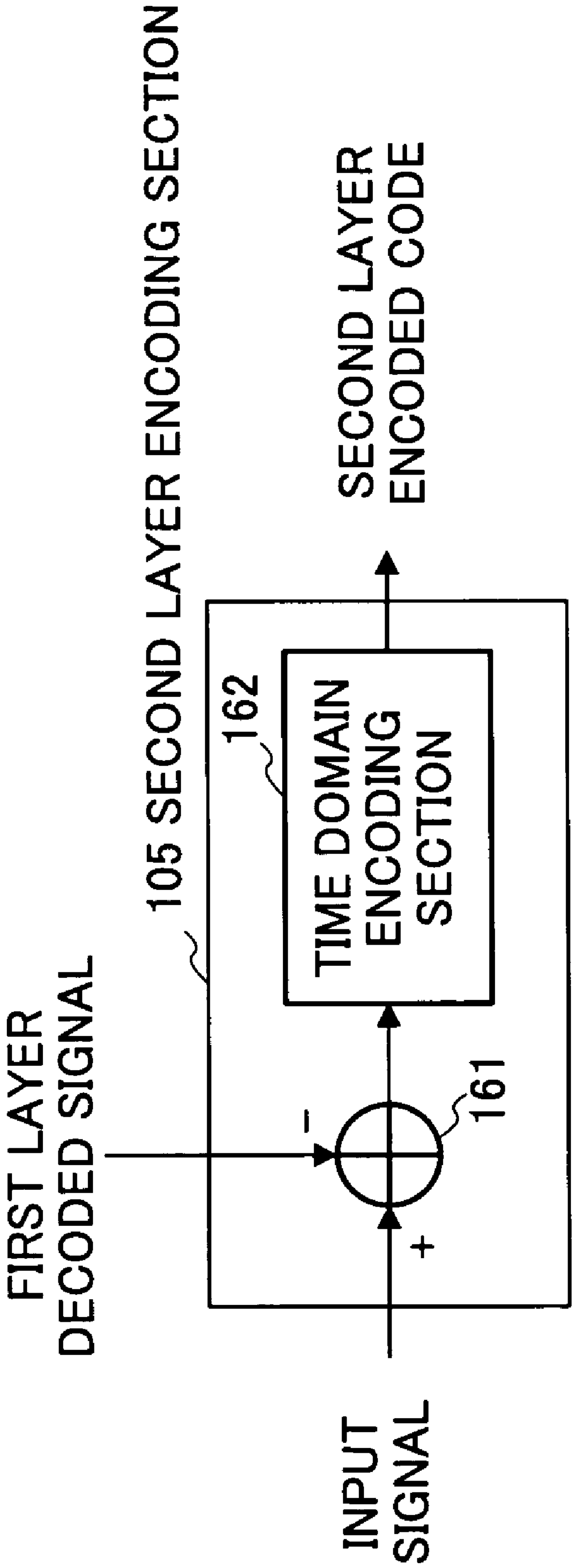
FIG. 9 is a block diagram showing the main configuration of an internal part of a second layer encoding section according to Embodiment 1.

FIG. 9 is a block diagram showing the main configuration of an internal part of second layer encoding section 105.

An input signal subjected to delay processing is inputted from delay section 104, and a first layer decoded signal is inputted from first layer decoding section 102. Subtractor 161 subtracts the first layer decoded signal from the input signal, and gives the residual signal to time domain encoding section 162. Time domain encoding section 162 codes this residual signal and generates and outputs a second encoded code. Here, an encoding scheme such as CELP based on LPC coefficients and excitation signal model may be used.

Figure 10:
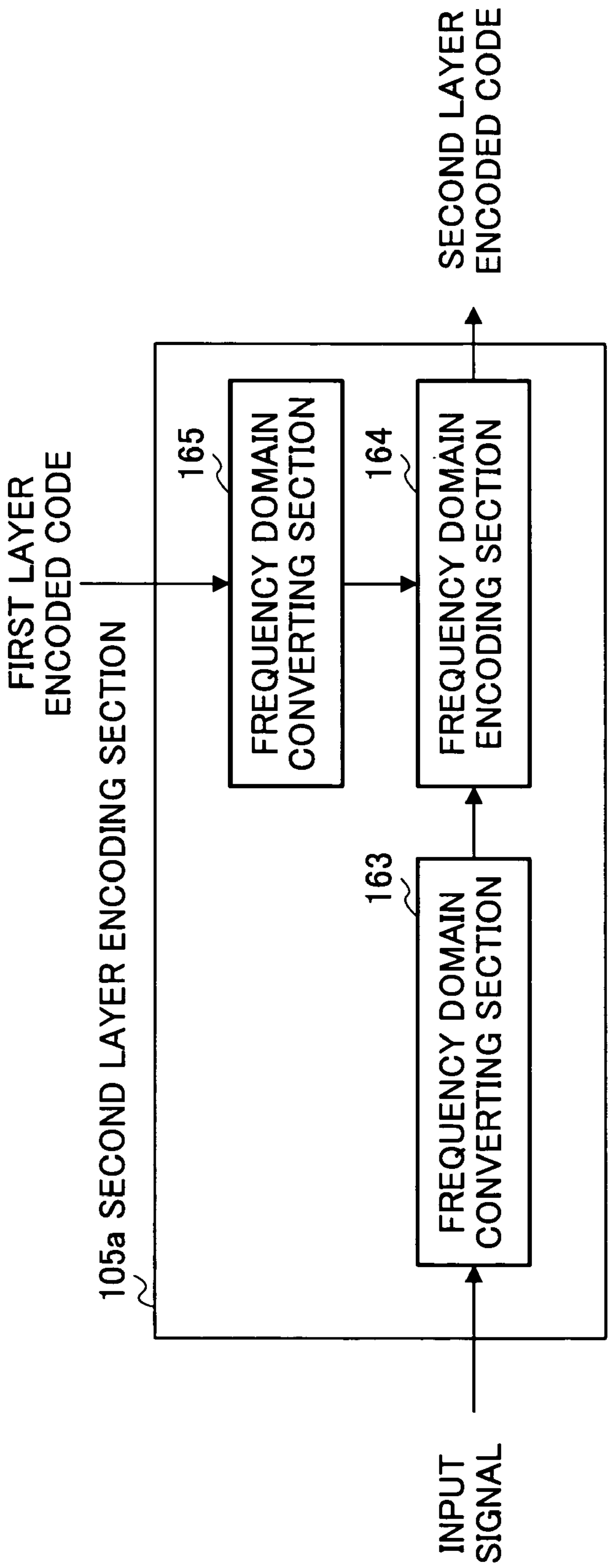
FIG. 10 is a block diagram showing another variation of the second layer encoding section according to Embodiment 1.

FIG. 10 is a block diagram showing another variation (second layer encoding section 105*a*) of second layer encoding section 105 shown in FIG. 9. It is a characteristic of this second layer encoding section 105*a* to apply a method of converting the input signal and first layer decoded signal to frequency domain and carrying out encoding on frequency domain.

An input signal subjected to delay processing is inputted from delay section 104, converted to an input spectrum at frequency domain conversion section 163, and given to frequency domain encoding section 164. Further, a first layer decoded signal is inputted from first layer decoding section 102, converted to a first layer decoded spectrum at frequency domain conversion section 165, and given to frequency domain encoding section 164. Frequency domain encoding section 164 carries out encoding using an input spectrum and first layer decoded spectrum given from frequency domain conversion sections 163 and 165, and generates and outputs a second encoded code. At frequency domain encoding section 164, it is possible to use an encoding scheme that reduces auditory distortion using auditory masking.

Each part of hierarchical decoding apparatus 170 that decodes coded information coded at the above-described hierarchical encoding apparatus 100 will be described in detail below.

Figure 11:
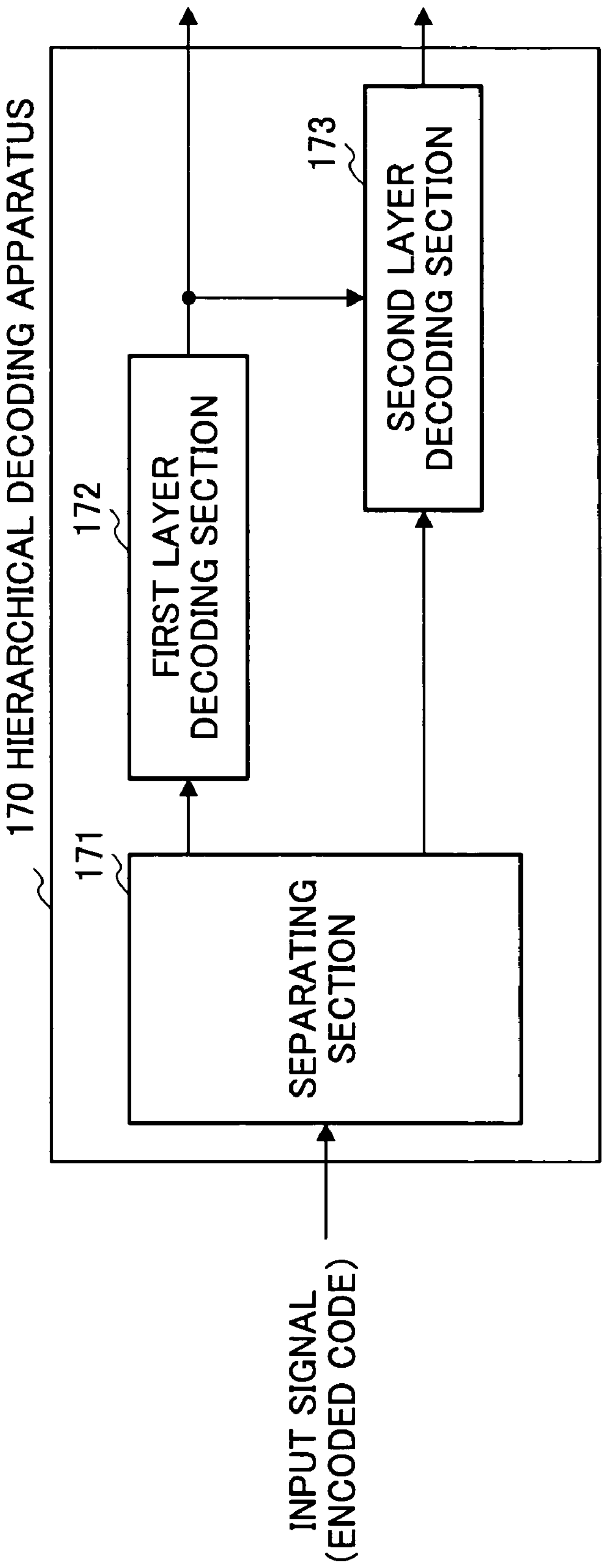
FIG. 11 is a block diagram showing the main configuration of an internal part of the hierarchical decoding apparatus according to Embodiment 1.

FIG. 11 is a block diagram showing the main configuration of the internal part of hierarchical decoding apparatus 170.

An encoded code is inputted to hierarchical decoding apparatus 170. Separating section 171 separates the inputted encoded code and generates an encoded code for first layer decoding section 172 and an encoded code for second layer decoding section 173. First layer decoding section 172 generates a first layer decoded signal using the encoded code obtained at separating section 171, and gives this decoded signal to second layer decoded section 173. Further, the first layer decoded signal is also directly outputted to outside of hierarchical decoding apparatus 170. As a result, when it is necessary to output the first layer decoded signal generated at first layer decoding section 172, this output can be used.

The second layer encoded code separated at separating section 171 and a first layer decoded signal obtained from first layer decoding section 172 are given to second layer decoding section 173. Second layer decoding section 173 carries out decoding processing described later and outputs a second layer decoded signal.

According to this configuration, when the first layer decoded signal generated at first layer decoding section 172 is required, it is possible to directly output the signal. Further, when it is necessary to output the output signal of second layer decoding section 173 with a higher quality, it is also possible to output this signal. Which of the decoded signals is outputted is based on an application, user setting or determination result.

Figure 12:
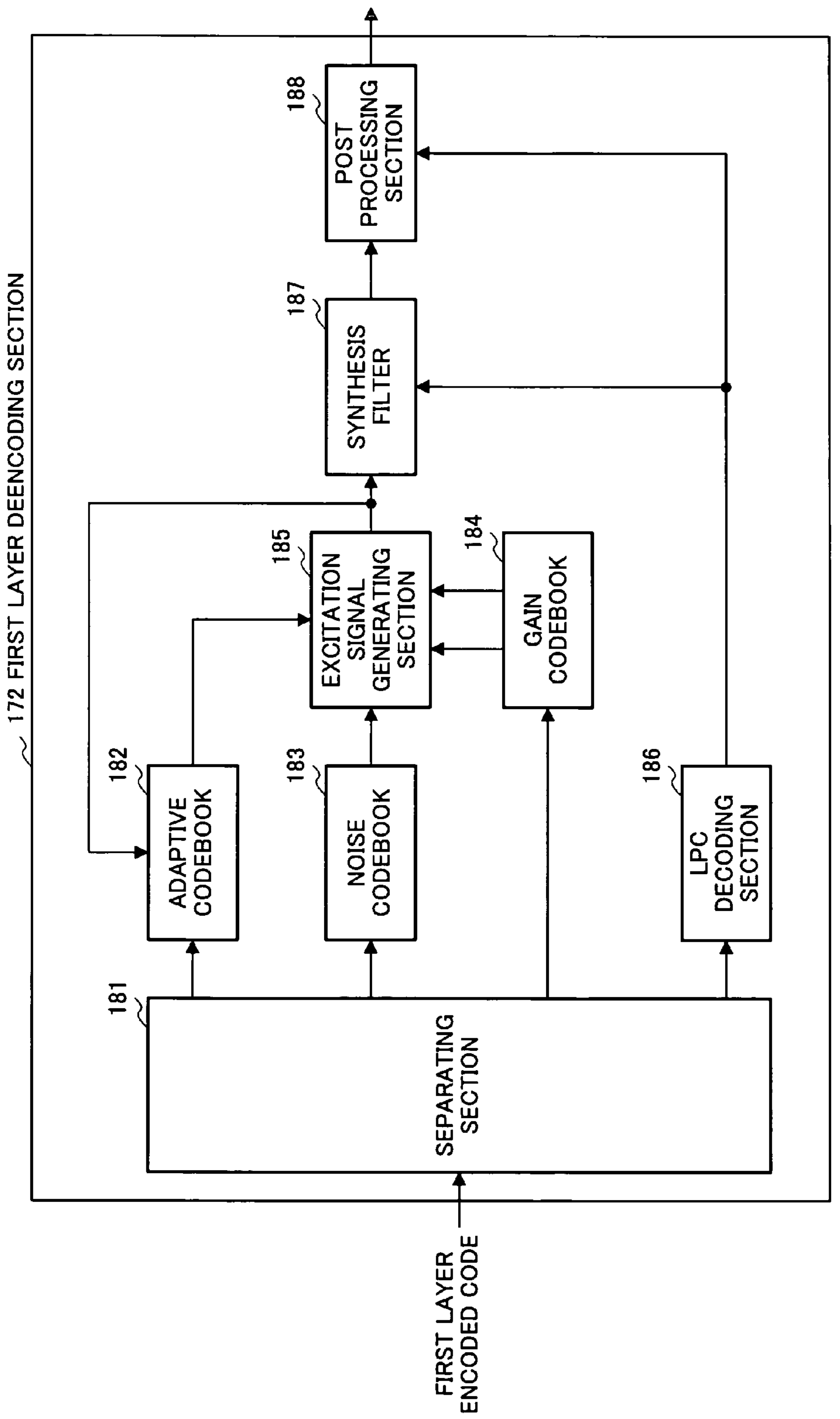
FIG. 12 is a block diagram showing the main configuration of an internal part of a first layer decoding section according to Embodiment 1.

FIG. 12 is a block diagram showing the main configuration of the internal part of first layer decoding section 172 when CELP is used in first layer encoding section 101. First layer decoding section 172 has a function for generating a first layer decoded signal using the encoded code generated at first layer encoding section 101.

First layer decoding section 172 separates an inputted first layer encoded code into an encoded code at separating section 181 to give to adaptive codebook 182, noise codebook 183, gain codebook 184 and LPC decoding section 186. LPC decoding section 186 decodes the LPC coefficients using the given encoded code and gives it to synthesis filter 187 and post processing section 188.

Next, adaptive codebook 182, noise codebook 183 and gain codebook 184 respectively decode adaptive vector q(i), noise vector c(i), adaptive vector gain $\beta_q$ and noise vector gain $\gamma_q$ using the encoded code. Gain codebook 184 may be expressed as vectors having the adaptive vector gain and noise gain vector as elements or may be in the form of holding the adaptive vector gain and noise vector gain as independent parameters, depending on the configuration of the gain of first layer encoding section 101.

Excitation signal generating section 185 multiplies the adaptive vector by the adaptive vector gain, multiplies the noise vector by the noise vector gain, adds the multiplied signals, and generates an excitation signal. When the excitation signal is ex(i), excitation signal ex(i) can be obtained as (equation 9) below.

[Equation 9]

$$ex(i)=\beta_q\cdot q(i)+\gamma_q\cdot c(i) \quad (9)$$

The above-described excitation signal may also be subjected to signal processing as post processing in order to improve subjective quality. This may correspond, for example, to pitch emphasis processing for improving sound quality by emphasizing periodicity of a periodic signal, pulse spreading processing for reducing the noisiness of a pulsed excitation signal, and smoothing processing for reducing unnecessary energy fluctuation of a background noise portion.

Next, synthesis signal syn(i) is generated in accordance with (equation 10) below at synthesis filter 187 using the decoded LPC coefficients and the excitation signal ex(i).

[Equation 10]

$$syn(i)=ex(i)+\sum_{j=1}^{NP}\alpha_q(j)\cdot syn(i-j) \quad (10)$$

Here, $\alpha_q(j)$ is the decoded LPC coefficients and NP is a number of the LPC coefficients. Decoded signal syn(i) decoded in this manner is then given to post processing section 188. There are cases where post processing section 188 applies post filter processing for improving auditory sound quality, or post noise processing for improving quality at the time of background noise. Here, a configuration has been described where first layer decoding section 172 includes post processing section 188, but it is also possible to adopt a configuration not having this kind of post processing section.

Figure 13:
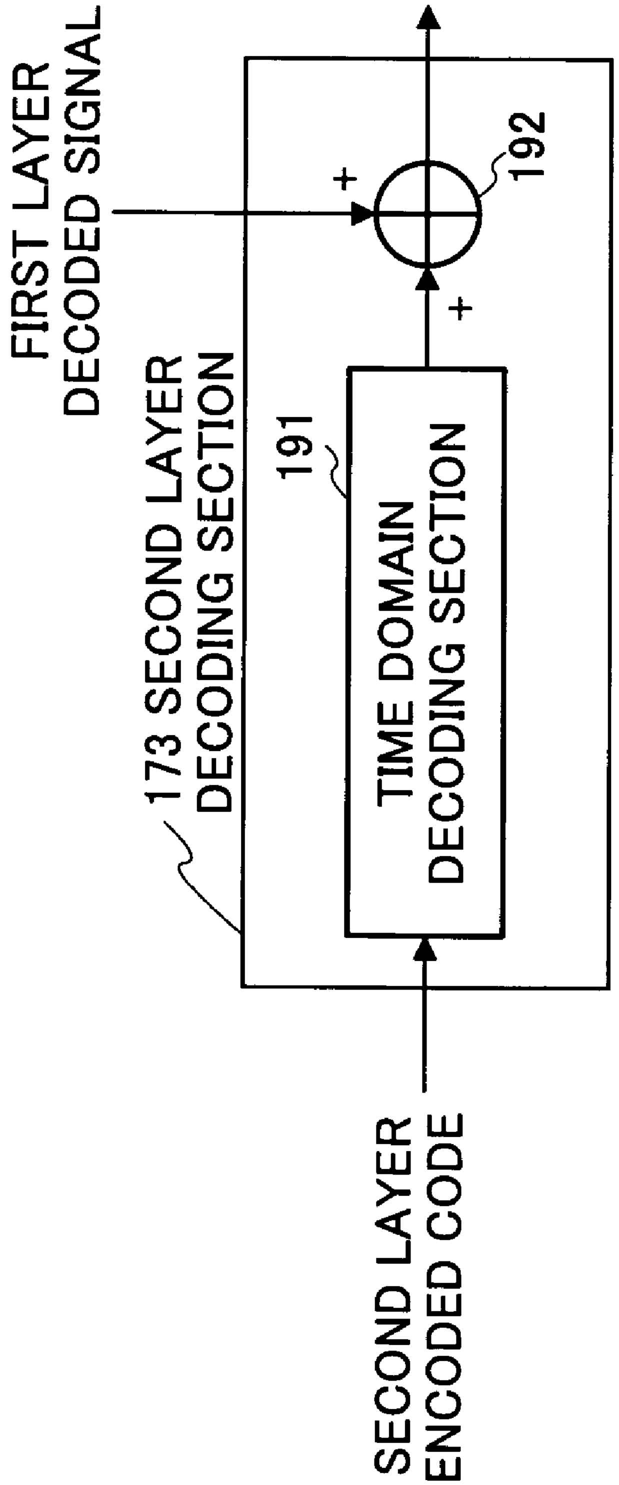
FIG. 13 is a block diagram showing the main configuration of an internal part of a second layer decoding section according to Embodiment 1.

FIG. 13 is a block diagram showing the main configuration of an internal part of second layer decoding section 173.

A second layer encoded code is inputted from separating section 181, and a second layer decoded residual signal is generated at time domain decoding section 191. When an encoding scheme such as CELP based on LPC coefficients and excitation model is used at second layer encoding section 105, this decoding processing is carried out so as to generate a signal at second layer decoding section 173.

Adding section 192 adds the inputted first layer decoded signal and second layer decoded residual signal given from time domain decoding section 191, and generates and outputs a second layer decoded signal.

Figure 14:
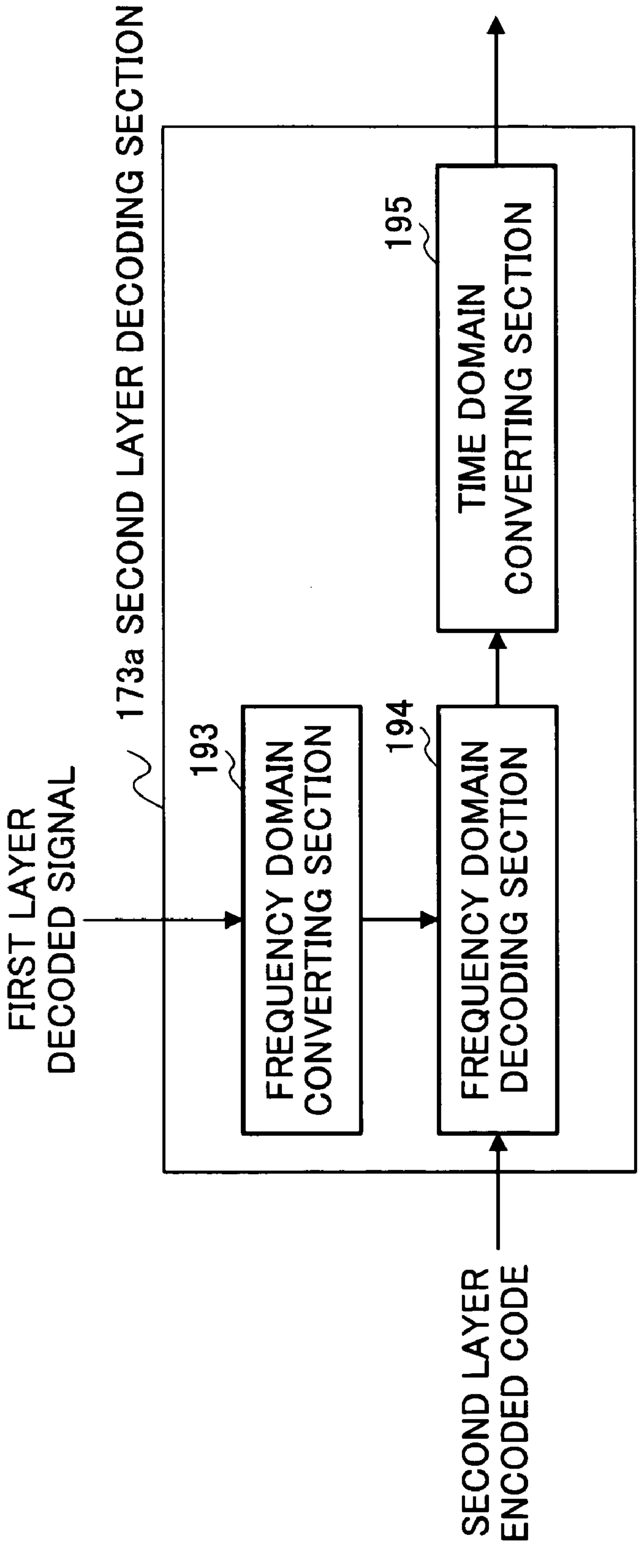
FIG. 14 is a block diagram showing another variation of the second layer decoding section according to Embodiment 1.

FIG. 14 is a block diagram showing another variation (second layer decoding section 173*a*) of second layer decoding section 173 shown in FIG. 13.

A characteristic of second layer decoding section 173*a* is that, when second layer encoding section 105 converts an input signal and first layer decoded signal to frequency domain and carries out encoding on frequency domain, it is possible to decode a second layer encoded code generated with this method.

A first layer decoded signal is then inputted, and a first layer decoded spectrum is generated at frequency domain conversion section 193 and given to frequency domain decoding section 194. Further, the second layer encoded code is inputted to frequency domain decoding section 194.

Frequency domain decoding section 194 generates a second layer decoded spectrum based on the second layer encoded code and first layer decoded spectrum and gives the spectrum to time domain conversion section 195. Here, frequency domain decoding section 194 carries out decoding processing corresponding to frequency domain encoding used at second layer encoding section 105 and generates a second layer decoded spectrum. The case is assumed where an encoding scheme reducing auditory distortion using auditory masking in this decoding processing.

Time domain conversion section 195 converts the given second layer decoded spectrum to a signal for a time domain and generates and outputs a second layer decoded signal. Here, according to necessary appropriate processing such as windowing and superposition addition is carried out, and discontinuity occurred between frames is avoided.

Embodiment 2

Hierarchical encoding apparatus 200 of Embodiment 2 of the present invention is provided with a configuration for detecting a voiced portion of the input signal, and when it is determined to be a voiced portion, the input signal is delayed in accordance with delay amount D obtained at a delay amount calculating section, and, when it is determined to be a portion other than the voiced (no sound, or background noise) portion, the input signal is delayed using predetermined delay amount Dc and adaptive delay control is not carried out.

As already shown in the lower part of FIG. 6, a delay amount obtained at the delay amount calculating section tends to fluctuate unstably at portions other than the voiced portion. This phenomena means that the delay amount of the input signal fluctuates frequently. When encoding is carried out using this signal, a decoded signal deteriorates in quality.

Here, in this embodiment, at portions other than the voiced portion, the input signal is delayed using predetermined delay amount Dc. As a result, it is possible to suppress the phenomena that the delay amount of the input signal fluctuates frequently and prevent deterioration in quality of the decoded signal.

Figure 15:
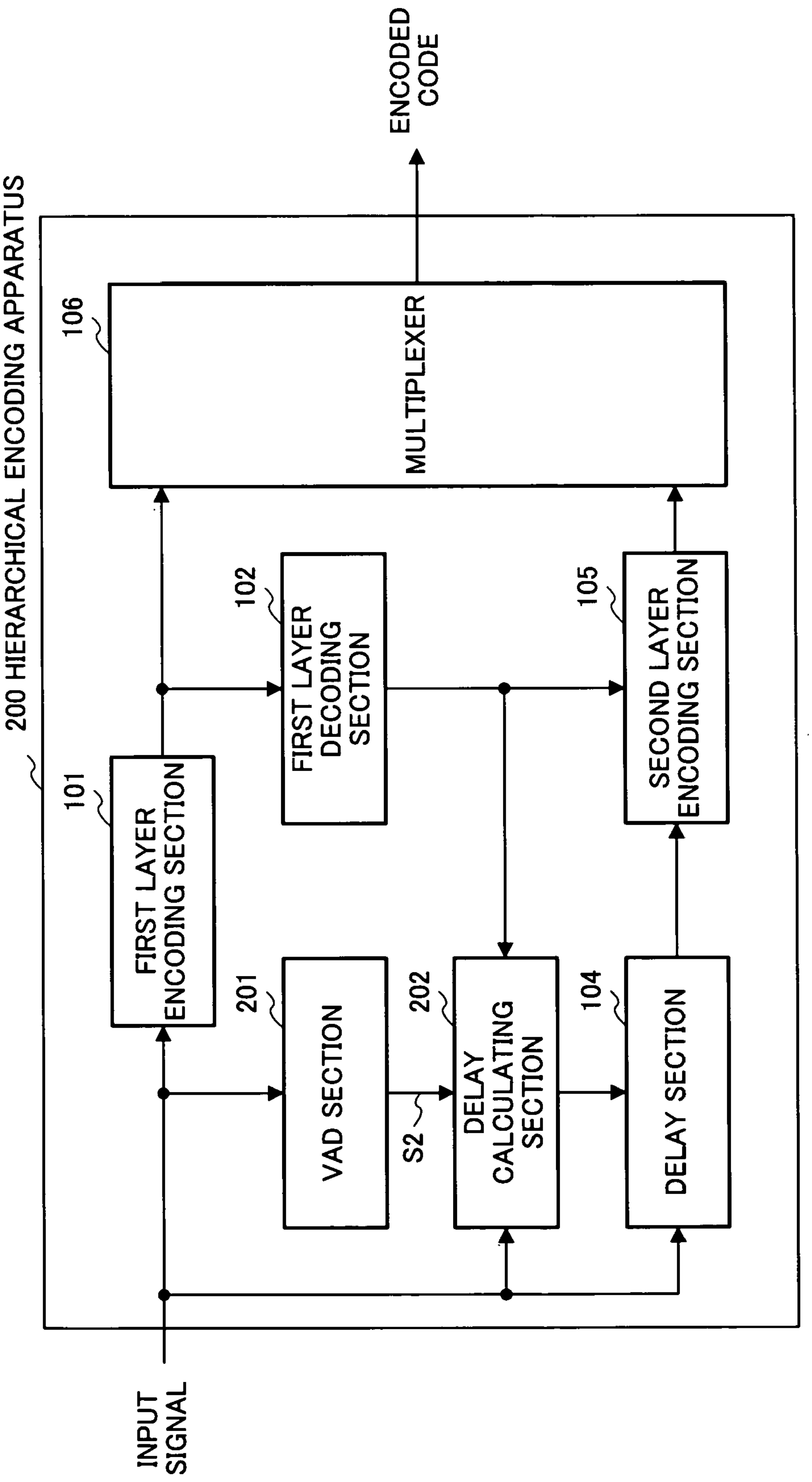
FIG. 15 is a block diagram showing the main configuration of the hierarchical encoding apparatus according to Embodiment 2.

FIG. 15 is a block diagram showing the main configuration of hierarchical encoding apparatus 200 according to this embodiment. This hierarchical encoding apparatus has the same basic configuration as hierarchical encoding apparatus 100 (refer to FIG. 4) shown in Embodiment 1. Components that are identical will be assigned the same reference numerals without further explanations VAD section 201 determines (detects) whether an input signal is voiced or other than voiced (no sound, or background noise) using the input signal. To be more specific, VAD section 201 analyzes the input signal, obtains, for example, energy information or spectrum information, and carries out voiced determination based on these information. A configuration for carrying out voiced determination using LPC coefficients, pitch period, or gain information etc. obtained at first layer encoding section 101 is also possible. Determination information S2 obtained in this way is then given to delay amount calculating section 202.

Figure 16:
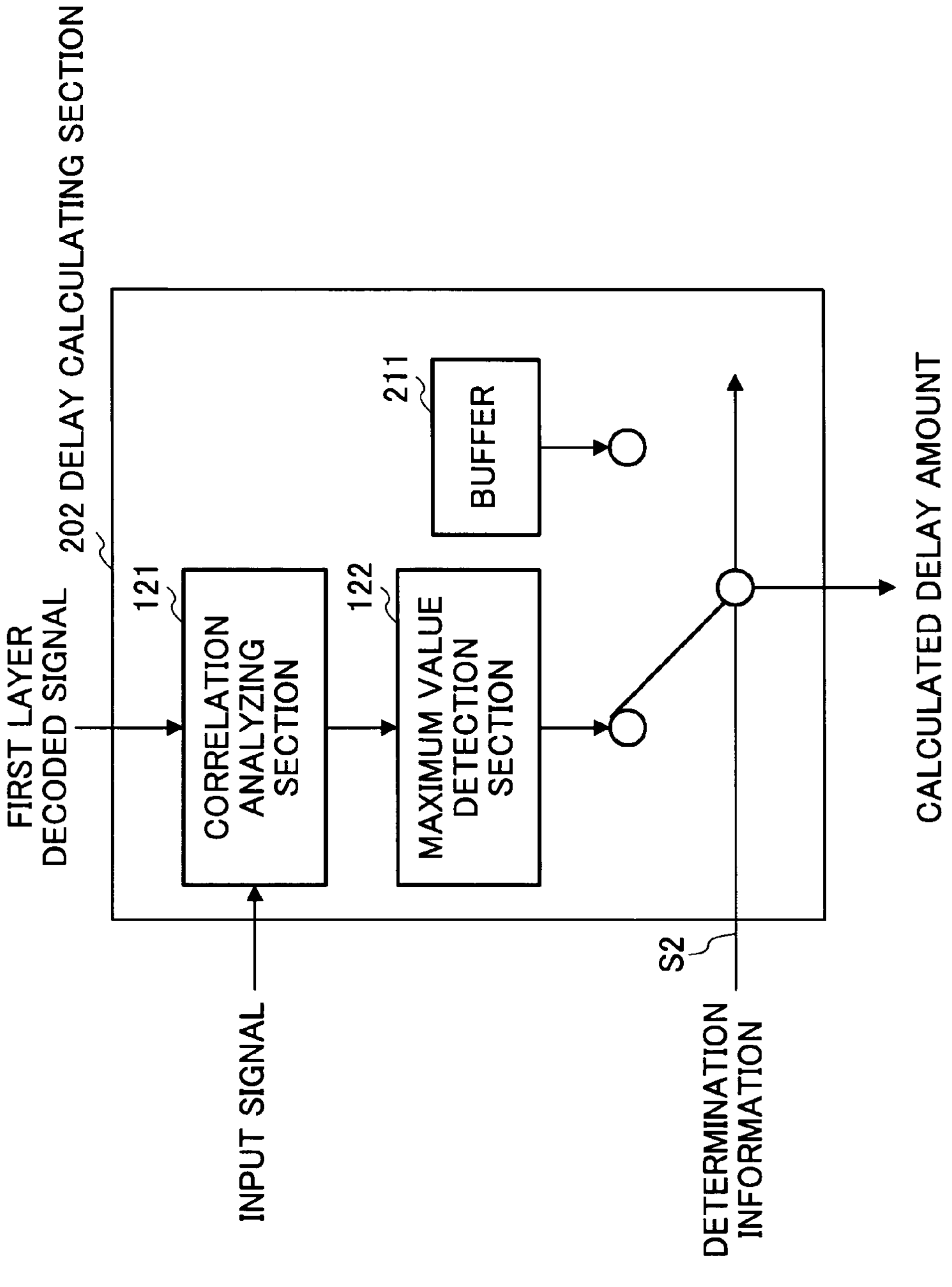
FIG. 16 is a block diagram showing the main configuration of an internal part of a delay amount calculating section according to Embodiment 2.

FIG. 16 is a block diagram showing the main configuration of an internal part of delay amount calculating section 202. When it is determined to be voiced based on the determination information given from VAD section 201, delay amount calculating section 202 outputs delay amount D(n) obtained at maximum value detection section 122. On the other hand, when the determination information is not voiced, delay amount calculating section 202 outputs delay amount Dc registered in advance in buffer 211.

Embodiment 3

The hierarchical encoding apparatus of Embodiment 3 of the present invention includes internal delay amount calculating section 301 that holds delay amount D(n−1) obtained in the previous frame (n−1th frame) in a buffer, and limits the range of analysis when correlation analysis is carried out at the current frame (nth frame) to the vicinity of D(n−1). Namely, limitation is added so that the delay amount used for the current frame is within a fixed range of the delay amount used in the previous frame. Accordingly, when delay amount D fluctuates substantially as shown in the lower part of FIG. 6, it is possible to avoid the problem where discontinuous portions occur in the outputted decoded signal and a strange noise occurs as a result.

The hierarchical encoding apparatus according to this embodiment has the same basic configuration as hierarchical encoding apparatus 100 (refer to FIG. 4) shown in Embodiment 1, and therefore explanation is omitted.

Figure 17:
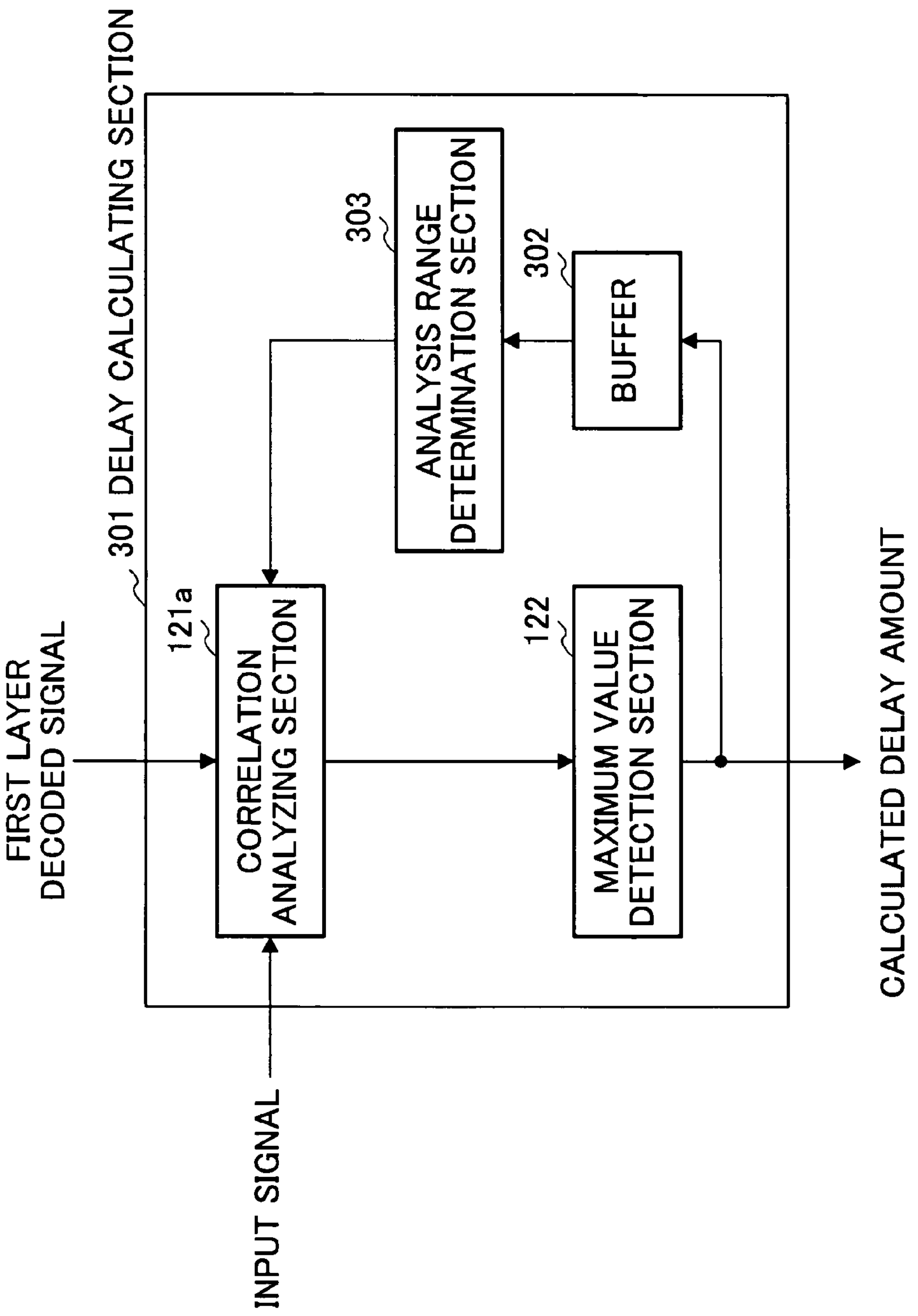
FIG. 17 is a block diagram showing the main configuration of the delay amount calculating section according to Embodiment 3.

FIG. 17 is a block diagram showing the main configuration of the above-described delay calculating section 301. This delay amount calculating section 301 has the same basic configuration as delay calculating section 103 shown in Embodiment 1. Components that are identical will be assigned the same reference numerals without further explanations.

Buffer 302 holds a value for delay amount D(n−1) obtained in the previous frame (n−1th frame) and gives this delay amount D(n−1) to analysis range determination section 303. Analysis range determination section 303 decides the range of the delay amount for obtaining a cross-correlation value for deciding a delay amount for the current frame (nth frame) and gives this to correlation analysis section 121*a*. Rmin and Rmax expressing the analysis range of delay amount D(n) of the current frame can be expressed as (equation 11) and (equation 12) below using delay amount D(n−1) for the previous frame.

[Equation 11]

$$R_{min}=\mathrm{Max}(D\mathrm{MIN},D(n-1)-H) \quad (11)$$

[Equation 12]

$$R_{max}=\mathrm{Min}(D(n-1)+H,D\mathrm{MAX}) \quad (12)$$

Here, DMIN is the minimum value that can be taken by Rmin, DMAX is the maximum value that can be taken by Rmax, Min( ) is a function outputting the minimum value of the input value, and Max( ) is a function outputting the maximum value of the input value. Further, H is the search range for delay amount D(n−1) for the previous frame.

Correlation analysis section 121*a* carries out correlation analysis on delay amount D included in the range of analysis range Rmin≦D≦Rmax given from analysis range determination section 303, calculates cross-correlation value Cor(D) to give to maximum value detection section 122. Maximum value detection section 122 obtains delay amount D at the time of cross-correlation value Cor(D) {where Rmin≦D≦Rmax} being a maximum to output as delay amount D(n) for the nth frame. Together with this, delay amount D(n) is given to buffer 302 to prepare for processing of the next frame.

In this embodiment, a case has been described where limitation is added to the delay amount for the current frame so that this delay amount is within a fixed range of the delay amount used at the previous frame. However, it is also possible to set the delay amount used in the current frame to be within a predetermined range, for example, to be a standard delay amount set in advance, and add limitation so that the delay amount is within a predetermined range with respect to the standard delay amount.

Embodiment 4

The hierarchical encoding apparatus according to Embodiment 4 of the present invention is provided with an up-sampling section at a front stage of a correlation analyzing section, and after increasing (up-sampling) a sampling rate of the input signal, carries out correlation analysis with the first layer decoded signal and calculates the delay amount. As a result, it is possible to obtain a delay amount expressed by a decimal value with high accuracy.

The hierarchical encoding apparatus according to this embodiment has the same basic configuration as hierarchical encoding apparatus 100 (refer to FIG. 4) shown in Embodiment 1, and therefore explanation is omitted.

Figure 18:
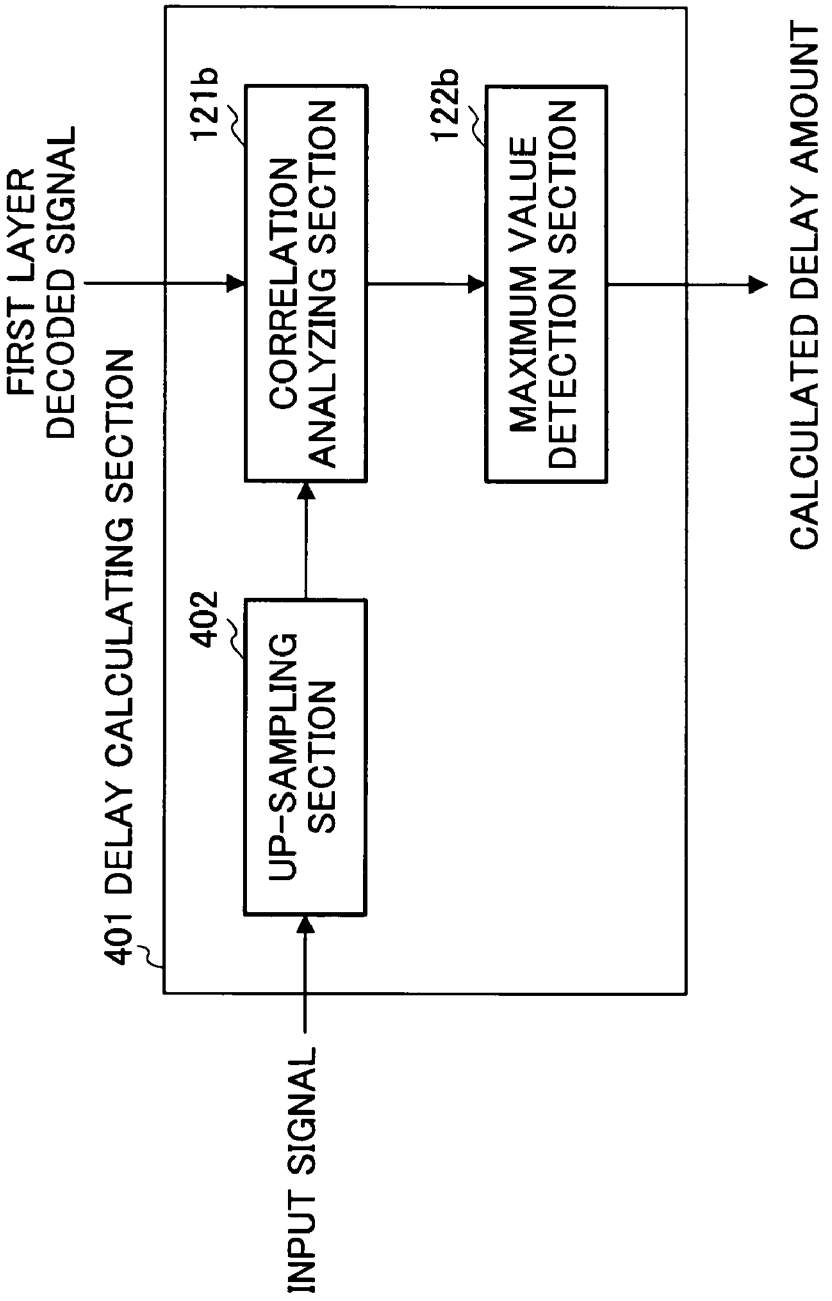
FIG. 18 is a block diagram showing the main configuration of the delay amount calculating section according to Embodiment 4.

FIG. 18 is a block diagram showing the main configuration of delay calculating section 401 of this embodiment. This delay amount calculating section 401 has the same basic configuration as delay calculating section 103 shown in Embodiment 1. Components that are identical will be assigned the same reference numerals without further explanations.

Up-sampling section 402 carries out up-sampling on input signal s(i), generates signal s'(i) with its sampling rate increased, and gives input signal s'(i) subjected to up-sampling to correlation analyzing section 121*b*. The case where the sampling rate is made to U times will be described below as an example.

Correlation analyzing section 121*b* calculates cross-correlation value Cor(D) using input signal s'(i) subjected to up-sampling and first layer decoded signal y(i). Cross-correlation value Cor(D) can be calculated using (equation 13) below.

[Equation 13]

$$Cor(D)=\sum_{i=(n-1)\cdot FL}^{n\cdot FL-1} s'(U\cdot i-D)\cdot y(i) \quad (13)$$

It is also possible to follow (equation 14) below.

[Equation 14]

$$Cor(D)=\frac{\sum_{i=(n-1)\cdot FL}^{n\cdot FL-1} s'(U\cdot i-D)\cdot y(i)}{\sqrt{\sum_{i=(n-1)\cdot FL}^{n\cdot FL-1} s'(U\cdot i-D)^2}\cdot\sqrt{\sum_{i=(n-1)\cdot FL}^{n\cdot FL-1} y(i)^2}} \quad (14)$$

Further, it is also possible to follow an equation multiplied by weighting coefficient w(D) as described above. Correlation analyzing section 121*b* gives the cross-correlation value calculated in this way to maximum value detection section 122*b*.

Maximum value detection section 122*b* obtains D that corresponds a maximum value of cross-correlation value Cor (D), and outputs a decimal value expressed by ratio D/U as delay amount D(n).

It is also possible to directly give a signal phase-shifted by just delay amount D/U with respect to input signal s'(i) subjected to up-sampling obtained at correlation analyzing section 121*b* to second layer encoding section 105. When a signal given to second layer encoding section 105 is s"(i), s"(i) can be expressed as shown in (equation 15) below.

[Equation 15]

$$s''(i)=s'(U\cdot i-D) \quad (15)$$

In this way, a delay amount is calculated after a sampling rate of the input signal increases so that it is possible to carry out processing based on the delay amount with higher accuracy. Further, if the input signal subjected to up-sampling is directly given to the second layer encoding section, it is no longer necessary to carry out new up-sampling processing, so that it is possible to prevent increase in the amount of calculation.

Embodiment 5

This embodiment discloses the hierarchical encoding apparatus that is capable of carrying out encoding even when the sampling rate (sampling frequency) of the input signal given to first layer encoding section 101—the sampling rate of an output signal of first layer decoding section 102—and the sampling rate of an input signal given to second layer encoding section 105, are different. The hierarchical encoding apparatus according to Embodiment 5 of the present invention is provided with down-sampling section 501 at a front stage of first layer encoding section 101 and up-sampling section 502 at a rear stage of first layer decoding section 102.

According to this configuration, it is possible to unify the sampling rates of the two signals inputted to delay calculating section 103 so that it is possible to be compatible with band-scalable encoding having scalability in a frequency axis direction.

Figure 19:
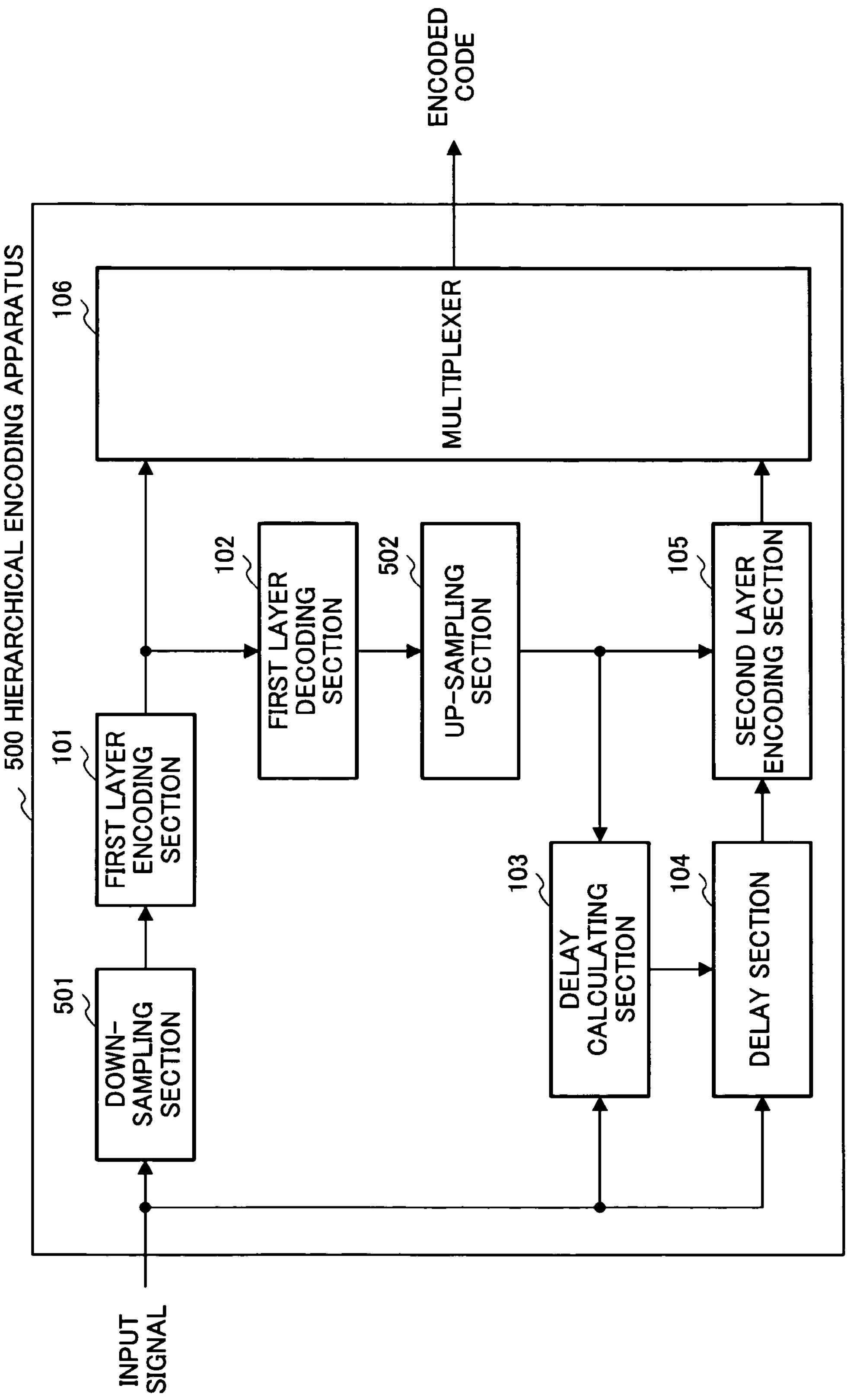
FIG. 19 is a block diagram showing the main configuration of the hierarchical encoding apparatus according to Embodiment 5.

FIG. 19 is a block diagram showing the main configuration of hierarchical encoding apparatus 500 according to this embodiment. This hierarchical encoding apparatus has the same basic configuration as hierarchical encoding apparatus 100 shown in Embodiment 1. Components that are identical will be assigned the same reference numerals without further explanations.

Down-sampling section 501 lowers the sampling rate of the input signal to give to first layer encoding section 101. When the sampling rate of the input signal is Fs and the sampling rate of the input signal given to first layer encoding section 101 is Fs1, down-sampling section 501 carries out down-sampling so that the sampling rate of the input signal is converted from Fs to Fs1.

After increasing the sampling rate of the first layer decoded signal, up-sampling section 502 gives this signal to delay calculating section 103 and second layer encoding section 105. When the sampling rate of the first layer decoded signal given from first layer decoding section 102 is Fs1 and the sampling rate of the signal given to delay calculating section 103 and second layer encoding section 105 is Fs2, up-sampling section 502 carries out up-sampling processing so that the sampling rate of the first layer decoded signal is converted from Fs1 to Fs2.

In this embodiment, sampling rates Fs and Fs2 have the same value. In this case, delay amount calculating sections described in Embodiments 1 to 4 can be applied.

Embodiment 6

Figure 20:
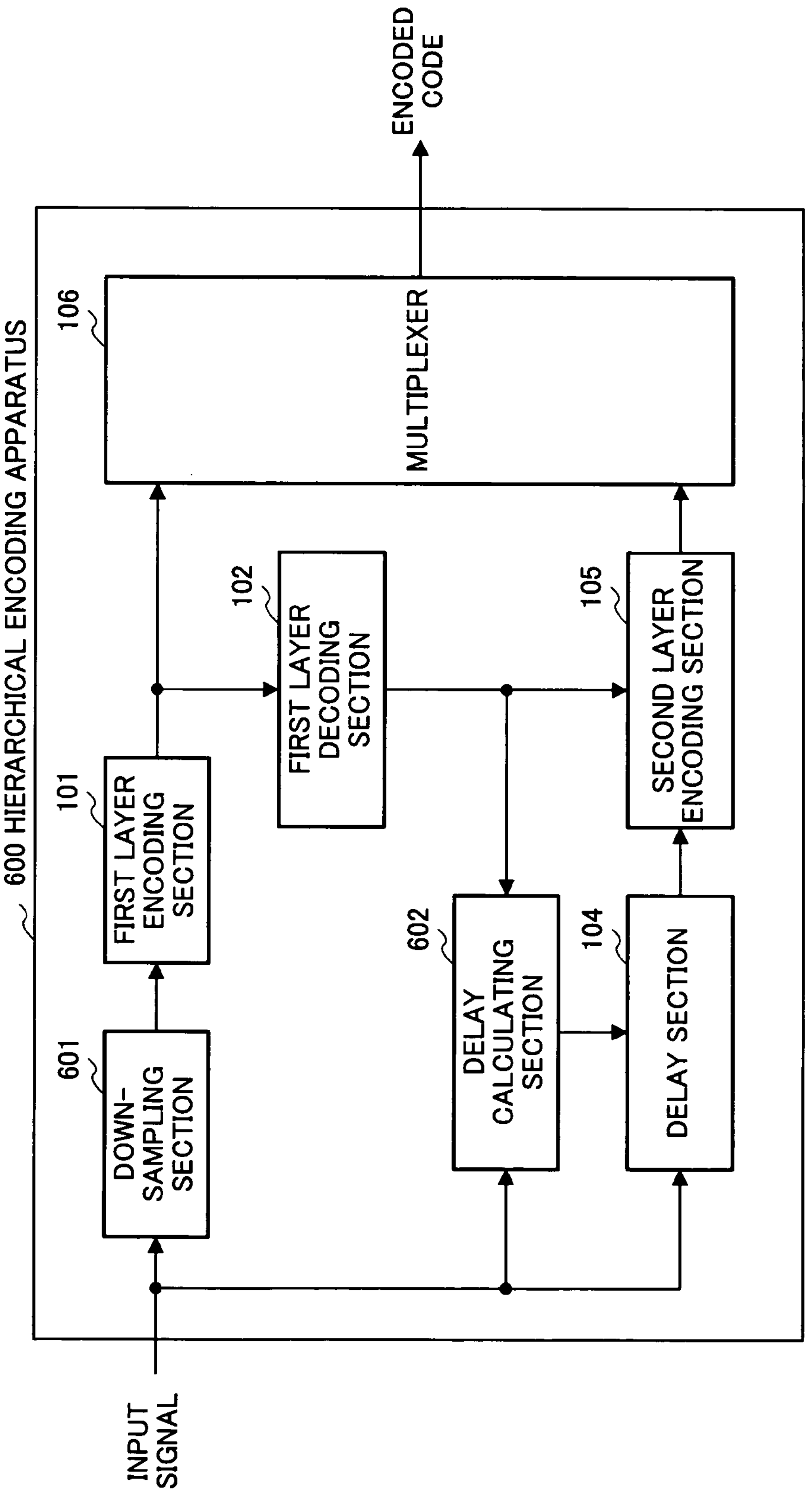
FIG. 20 is a block diagram showing the main configuration of the hierarchical encoding apparatus according to Embodiment 6.

FIG. 20 is a block diagram showing the main configuration of hierarchical encoding apparatus 600 according to Embodiment 6 of the present invention. This hierarchical encoding apparatus 600 has the same basic configuration as hierarchical encoding apparatus 100 shown in Embodiment 1. Components that are identical will be assigned the same reference numerals without further explanations.

In this embodiment, as in Embodiment 5, the sampling rate of the input signal given to first layer encoding section 101 and the sampling rate of the input signal given to second layer encoding section 105 are different. Hierarchical encoding apparatus 600 of this embodiment is provided with down-sampling section 601 at the front stage of first layer encoding section 101 but differs from Embodiment 5 in that up-sampling section 502 is not provided at the rear stage of first layer decoding section 102.

According to this embodiment, up-sampling section 502 is not necessary at the rear stage of first layer encoding section 101 so that it is possible to avoid increase in the amount of calculation amount and the delay required at this up-sampling section.

In the configuration of this embodiment, second layer encoding section 105 generates a second layer encoded code using an input signal of sampling rate Fs and a first layer decoded signal of sampling rate Fs1. Delay amount calculating section 602 that carries out operation different from that of delay calculating section 103 shown in Embodiment 1 etc. is provided. The input signal of sampling rate Fs and the first layer decoded signal of sampling rate Fs1 are inputted to delay amount calculating section 602.

Figure 21:
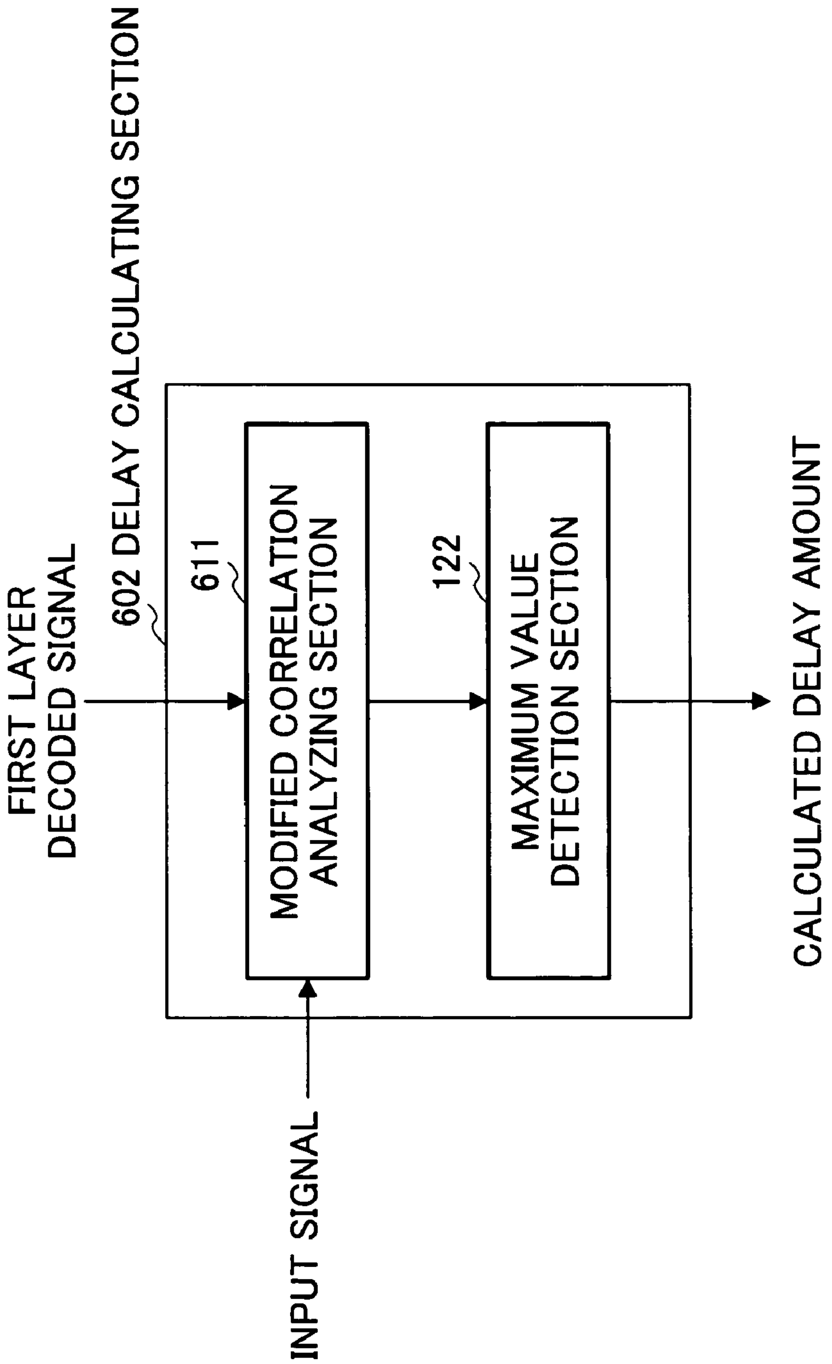
FIG. 21 is a block diagram showing the main configuration of an internal part of the delay amount calculating section according to Embodiment 6.

FIG. 21 is a block diagram showing the main configuration of an internal part of delay calculating section 602.

The input signal of sampling rate Fs and the first layer decoded signal of sampling rate Fs1 are given to modified correlation analyzing section 611. Modified correlation analyzing section 611 calculates a cross-correlation value from the relationship of sampling rates Fs and Fs1, using sample values at an appropriate sample interval. Specifically, the following processing is carried out.

When a minimum common multiple for sampling rate Fs and Fs1 is G, sample interval U of the input signal and sample interval V of the first layer output signal can be expressed as (equation 16) and (equation 17) below.

[Equation 16]

$$U=G/Fs1 \tag{16}$$

[Equation 17]

$$V=G/Fs \tag{17}$$

At this time, cross-correlation value Cor(D) calculated at modified correlation analyzing section 611 can be expressed as shown in (equation 18) below.

[Equation 18]

$$Cor(D) = \sum_{i=(n-1)\cdot FL/V}^{n\cdot FL/V-1} s(U\cdot i-D)\cdot y(V\cdot i) \tag{18}$$

It is also possible to follow (equation 19) below.

[Equation 19]

$$Cor(D) = \frac{\sum_{i=(n-1)\cdot FL/V}^{n\cdot FL/V-1} s(U\cdot i-D)\cdot y(V\cdot i)}{\sqrt{\sum_{i=(n-1)\cdot FL/V}^{n\cdot FL/V-1} s(U\cdot i-D)^2}\cdot\sqrt{\sum_{i=(n-1)\cdot FL/V}^{n\cdot FL/V-1} y(V\cdot i)^2}} \tag{19}$$

Further, it is also possible to follow an equation multiplied by weighting coefficient w(D) as described above. The cross-correlation value calculated in this way is then given to maximum value detection section 122.

Figure 22:
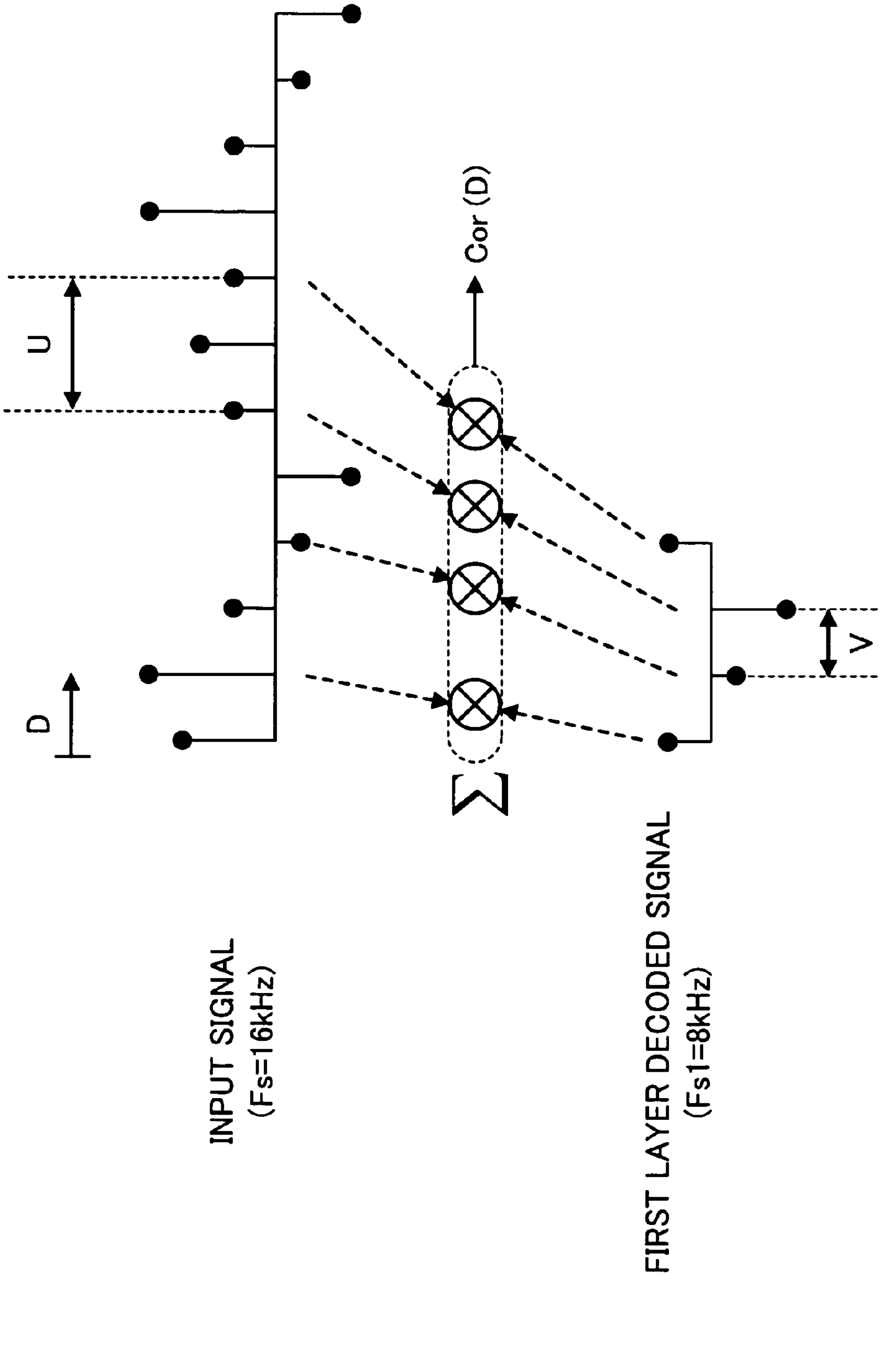
FIG. 22 illustrates an outline of processing carried out at a modified correlation analyzing section according to Embodiment 6.

FIG. 22 illustrates an outline of processing carried out at modified correlation analyzing section 611. Here, processing is shown under the condition that sampling rate Fs of the input signal is 16 kHz, and sampling rate Fs1 of the first layer decoded signal is 8 kHz.

When the sampling rate is under the above-described condition, minimum common multiple G becomes 16000 and sample interval U of the input signal and sample interval V of the first layer output signal become U=2, V=1, respectively. Here, a cross-correlation value is calculated as shown in the drawings in accordance with the relationship of the sample intervals.

Figure 23:
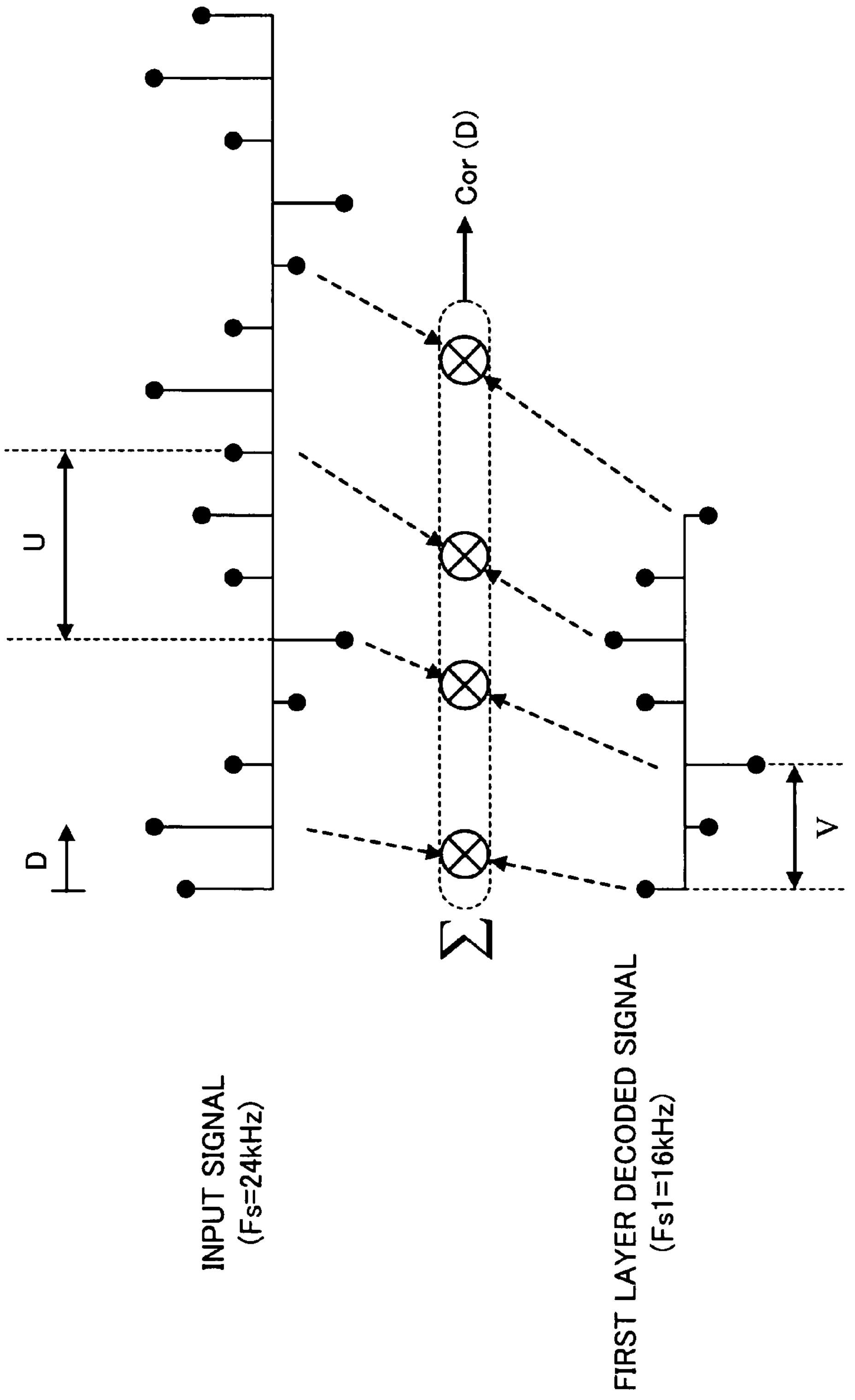
FIG. 23 shows another variation of processings carried out at a modified correlation analyzing section according to Embodiment 6.

FIG. 23 shows another variation of processing carried out at modified correlation analyzing section 611. Here, processing is shown under the condition that sampling rate Fs of the input signal is 24 kHz, and sampling rate Fs1 of the first layer decoded signal is 16 kHz.

When the sampling rate is under the above-described condition, minimum common multiple G becomes 48000 and sample interval U of the input signal and sample interval V of the first layer output signal become U=3, V=2, respectively. Here, a cross-correlation value is calculated as shown in the drawings in accordance with the relationship of the sample intervals.

Embodiment 7

The hierarchical encoding apparatus according to Embodiment 7 of the present invention includes internal delay amount calculating section 701 that holds delay amount D(n−1) obtained in the previous frame in a buffer, and limits the range of analysis when correlation analysis is carried out at the current frame to the vicinity of D(n−1). Accordingly, when delay amount D fluctuates substantially as shown in the lower part of FIG. 6, it is possible to avoid the problem where discontinuous portions occur in the input signal and a strange noise occurs as a result.

The hierarchical encoding apparatus of this embodiment has the same basic configuration as hierarchical encoding apparatus 100 (refer to FIG. 4) shown in Embodiment 1, and therefore explanation is omitted.

Figure 24:
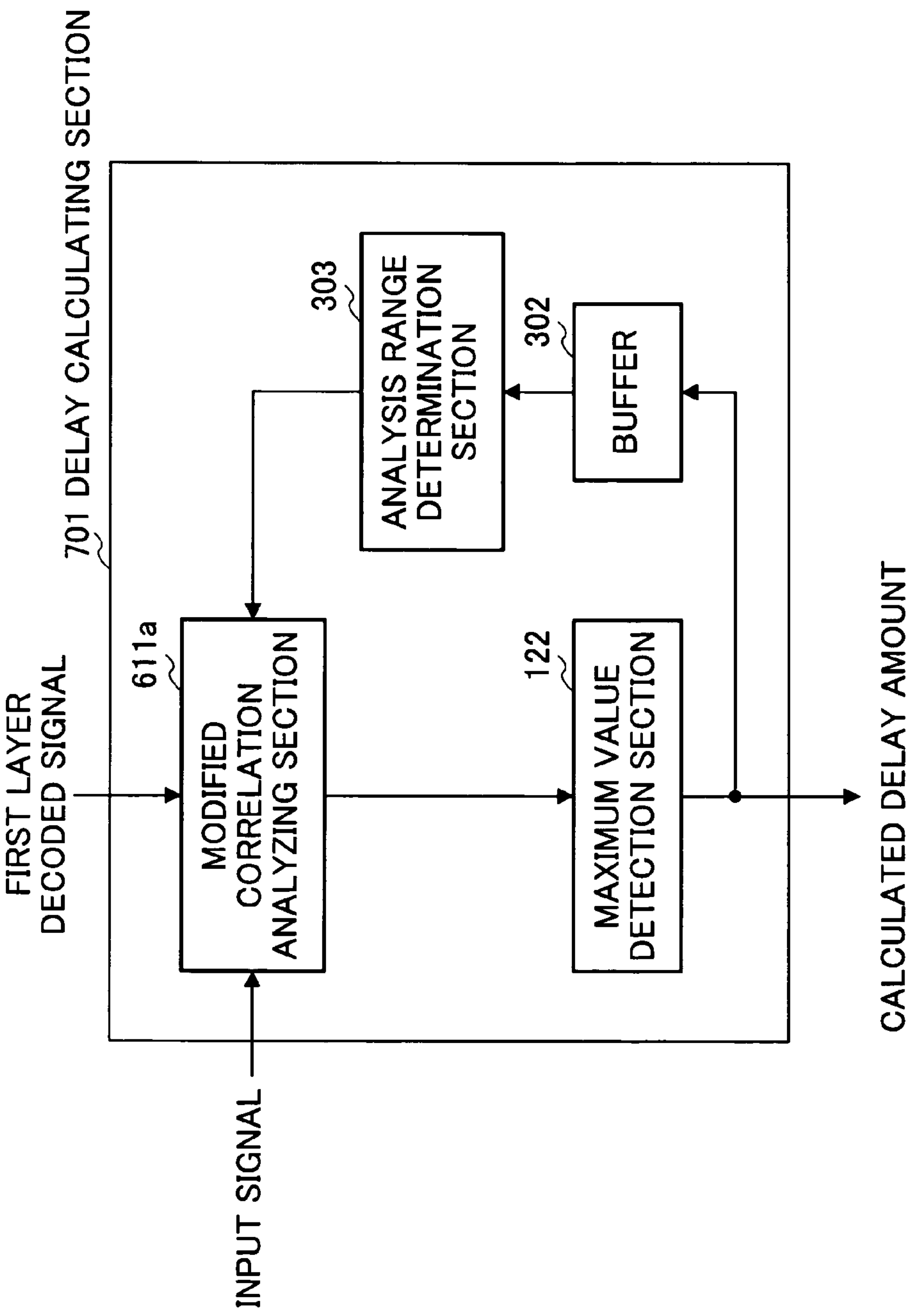
FIG. 24 is a block diagram showing the main configuration of the delay amount calculating section according to Embodiment 7.

FIG. 24 is a block diagram showing the main configuration of the above-described delay calculating section 701. This delay amount calculating section 701 has the same basic configuration as delay calculating section 301 shown in Embodiment 3. Components that are identical will be assigned the same reference numerals without further explanations. Further, modified correlation analyzing section 611*a* has the same function as modified correlation analyzing section 611 shown in Embodiment 6.

Buffer 302 holds a value for delay amount D(n−1) obtained in the previous frame (n−1th frame) and gives this delay amount D(n−1) to analysis range determination section 303. Analysis range determination section 303 determines the range of the delay amount to obtain a cross-correlation value for deciding a delay amount for the current frame (nth frame) and gives this range to modified correlation analyzing section 611*a*. Rmin and Rmax expressing the analysis range of delay amount D(n) of the current frame can be expressed as (equation 20) and (equation 21) below using delay amount D(n−1) for the previous frame.

[Equation 20]

$$R_{min}=\text{Max}(D\text{MIN},D(n-1)-H) \tag{20}$$

[Equation 21]

$$R_{max}=\text{Min}(D(n-1)+H,D\text{MAX}) \tag{20}$$

Here, DMIN is the minimum value that can be taken by Rmin, DMAX is the maximum value that can be taken by Rmax, Min( ) is a function outputting the minimum value of the input value, and Max( ) is a function outputting the maximum value of the input value. Further, H is the search range for delay amount D(n−1) for the previous frame.

Modified correlation analyzing section 611*a* carries out correlation analysis on delay amount D included in the range of analysis range Rmin≦D≦Rmax given from analysis range determination section 303, calculates cross-correlation value Cor(D) to give to maximum value detection section 122. Maximum value detection section 122 obtains delay amount D at the time of cross-correlation value Cor(D) {where Rmin≦D≦Rmax} being a maximum to output as delay amount D(n) for the nth frame. Together with this, modified correlation analyzing section 611*a* gives delay amount D(n) to buffer 302 to prepare for processing of the next frame.

Embodiment 8

The hierarchical encoding apparatus according to Embodiment 8 of the present invention carries out correlation analysis of a first layer decoded signal after increasing the sampling rate of the input signal. As a result, it is possible to obtain a delay amount expressed by a decimal value with high accuracy.

The hierarchical encoding apparatus according to this embodiment has the same basic configuration as hierarchical encoding apparatus 100 (refer to FIG. 4) shown in Embodiment 1, and therefore explanation is omitted.

Figure 25:
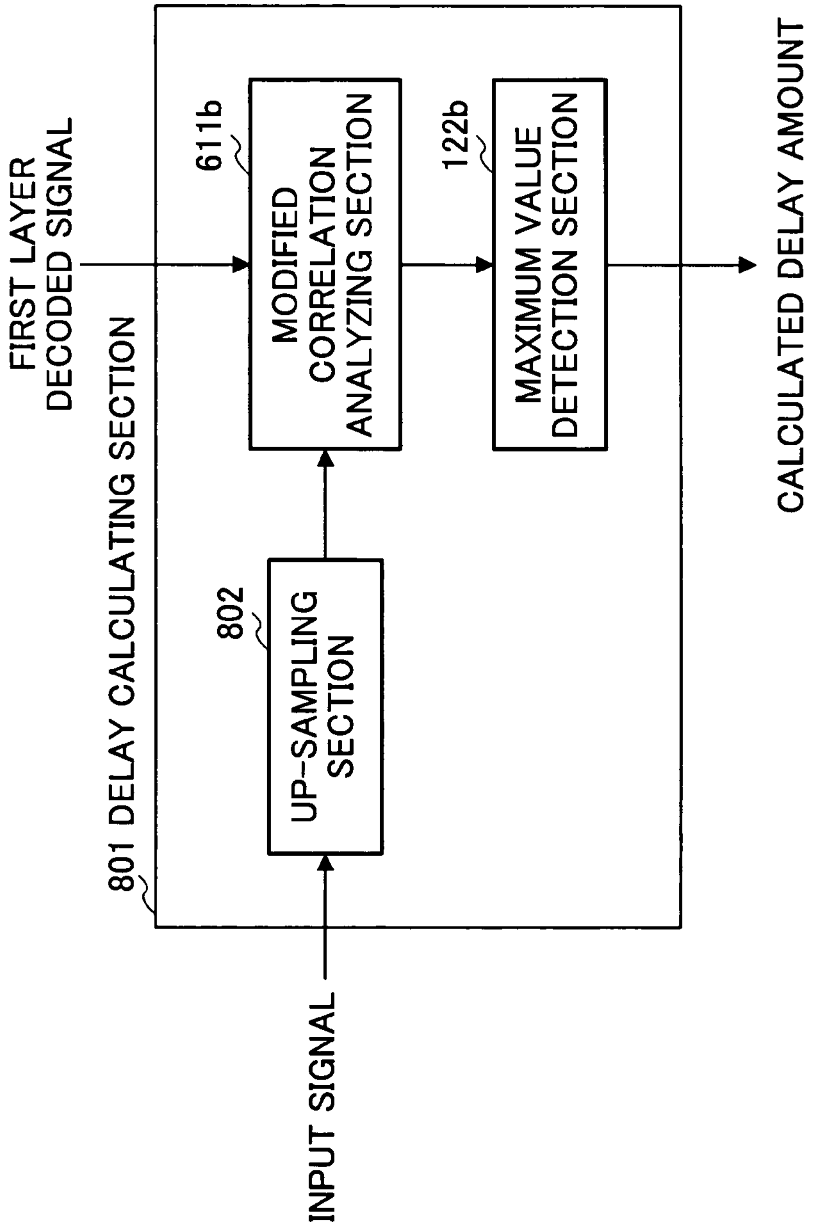
FIG. 25 is a block diagram showing the main configuration of a delay amount calculating section according to Embodiment 8.

FIG. 25 is a block diagram showing the main configuration of delay calculating section 801 according to this embodiment. This delay amount calculating section 801 has the same basic configuration as delay calculating section 602 shown in Embodiment 6. Components that are identical will be assigned the same reference numerals without further explanations.

Up-sampling section 802 carries out up-sampling on input signal s(i), generates signal s'(i) with its sampling rate increased, and gives input signal s'(i) subjected to up-sampling to modified correlation analyzing section 611*b*. Here, the case where the sampling rate is made to T times will be explained as an example.

Modified correlation analyzing section 611*b* calculates a cross-correlation value from the relationship between sampling rates T·Fs and Fs1 for input signal s'(i) subjected to up-sampling, using sample values at an appropriate sample interval. Specifically, the following processing is carried out.

When a minimum common multiple for sampling rate T·Fs and Fs1 is G, sample interval U of the input signal and sample interval V of the first layer output signal can be expressed as (equation 22) and (equation 23) below.

[Equation 22]

$$U=G/Fs1 \tag{22}$$

[Equation 23]

$$V=G/(T\cdot Fs) \tag{23}$$

At this time, cross-correlation value Cor(D) calculated at modified correlation analyzing section 611*b* can be expressed as shown in (equation 24) below.

[Equation 24]

$$Cor(D)=\sum_{i=(n-1)\cdot FL/V}^{n\cdot FL/V-1} s'(U\cdot i-D)\cdot y(V\cdot i) \tag{24}$$

It is also possible to follow (equation 25) below.

[Equation 25]

$$Cor(D) = \frac{\sum_{i=(n-1)\cdot FL/V}^{n\cdot FL/V-1} s'(U\cdot i - D)\cdot y(V\cdot i)}{\sqrt{\sum_{i=(n-1)\cdot FL/V}^{n\cdot FL/V-1} s'(U\cdot i - D)^2}\cdot\sqrt{\sum_{i=(n-1)\cdot FL/V}^{n\cdot FL/V-1} y(V\cdot i)^2}} \quad (25)$$

Further, it is possible to follow an equation multiplied by weighting coefficient w(D) as described above. The cross-correlation value calculated in this way is then given to maximum value detection section 122*b*.

Embodiments of the present invention have been described.

The hierarchical encoding apparatus of the present invention is by no means limited to the above-described embodiments, and various modifications thereof are possible. For example, the embodiments may be appropriately combined to implement.

The hierarchical encoding apparatus according to the present invention can be loaded on a communication terminal apparatus and base station apparatus of a mobile communication system, so that it is possible to provide a communication terminal apparatus and base station apparatus having the same operation effects as described above.

Here, the case of two layers has been described as an example, but the number of layers is by no means limited, and the present invention may also be applied to hierarchical encoding where the number of layers is three or more.

Further, a method has been described for controlling phase of an input signal so as to correct phase difference between an input signal and a first layer decoded signal, but conversely, a configuration of controlling phase of the first layer decoded signal so as to correct phase difference of both signals is also possible. In this case, it is necessary to code information indicating the manner in which the phase of the first layer decoded signal is controlled, and transfer the information to a decoding section.

Further, the noise codebook used in the above-described embodiments may also be referred to as a fixed codebook, stochastic codebook or random codebook.

Moreover, the case has been described as an example where the present invention is configured using hardware, but it is also possible to implement the present invention using software. For example, it is possible to implement the same functions as the hierarchical encoding apparatus of the present invention by describing algorithms of the hierarchical encoding methods of the present invention using programming language, storing this program in a memory and implementing by an information processing section.

Each function block used to explain the above-described embodiments may be typically implemented as an LSI constituted by an integrated circuit. These may be individual chips or may partially or totally contained on a single chip.

Furthermore, here, each function block is described as an LSI, but this may also be referred to as “IC”, “system LSI”, “super LSI”, “ultra LSI” depending on differing extents of integration.

Further, the method of circuit integration is not limited to LSI’s, and implementation using dedicated circuitry or general purpose processors is also possible. After LSI manufacture, utilization of a programmable FPGA (Field Programmable Gate Array) or a reconfigurable processor in which connections and settings of circuit cells within an LSI can be reconfigured is also possible.

Further, if integrated circuit technology comes out to replace LSI’s as a result of the development of semiconductor technology or a derivative other technology, it is naturally also possible to carry out function block integration using this technology. Application in biotechnology is also possible.

The present application is based on Japanese Patent Application No. 2004-134519 filed on Apr. 28, 2004, the entire content of which is expressly incorporated by reference herein.

INDUSTRIAL APPLICABILITY

The hierarchical encoding apparatus and hierarchical encoding method of the present invention is useful in a mobile communication system and the like.

The invention claimed is:

1. A hierarchical encoding apparatus comprising:

an (M−1)th layer encoding section that performs encoding processing on an input signal to produce an encoded signal of an (M−1)th layer;

an (M−1)th layer decoding section that decodes the encoded signal of the (M−1)th layer to produce a decoded signal of the (M−1)th layer;

a calculating section that calculates a delay amount at predetermined times from a phase difference between the decoded signal of the (M−1)th layer and the input signal;

a delay section that delays the input signal by an amount corresponding to the delay amount to produce a delayed signal; and an Mth layer encoding section that performs encoding processing employing the decoded signal of the (M−1)th layer and the delayed signal, wherein:

the calculating section further comprises a correlation section that, when a number of samples of the decoded signal of the (M−1)th layer and a number of samples of the input signal are different, unifies the number of samples in accordance with a signal with the smaller number of samples, and carries out correlation operation on the decoded signal of the (M−1)th layer and the input signal using part of the samples of a signal with the larger number of samples; and calculates the delay amount using a correlation result of the correlation section.

2. The hierarchical encoding apparatus according to claim 1, wherein the calculating section calculates the delay amount every processing unit time for encoding of the (M−1)th layer.

3. The hierarchical encoding apparatus according to claim 1, further comprising a determination section that determines whether or not the input signal is voiced, wherein the calculating section calculates the delay amount at the predetermined times when it is determined that the input signal is voiced, and sets the delay amount to a predetermined fixed value when it is determined that the input signal is not voiced.

4. The hierarchical encoding apparatus according to claim 1, wherein the calculating section calculates the delay given at the delay section so as to be within a fixed range with respect to a previously calculated delay.

5. The hierarchical encoding apparatus according to claim 1, wherein the calculating section calculates the delay amount within a predetermined range decided in advance.

6. The hierarchical encoding apparatus according to claim 1, wherein the calculating section up-samples the input signal in advance, and increases accuracy of calculating the delay amount.

7. A communication terminal apparatus comprising the hierarchical encoding apparatus according to claim 1.

8. A base station apparatus comprising the hierarchical encoding apparatus according to claim 1.

9. A hierarchical encoding method comprising:

an (M−1)th layer encoding step of performing, by an encoding apparatus, encoding processing on an input signal to produce an encoded signal of an (M−1)th layer;

an (M−1)th layer decoding step of decoding the encoded signal of the (M−1)th layer to produce a decoded signal of the (M−1)th layer;

a calculating step of calculating a delay amount at predetermined times from a phase difference between the decoded signal of the (M−1)th layer and the input signal;

a delay step of delaying the input signal by an amount corresponding to the delay amount to produce a delayed signal; and an Mth layer encoding step of performing encoding processing employing the decoded signal of the (M−1)th layer and the delayed signal, wherein:

the calculating step further comprises a correlation step of, when a number of samples of the decoded signal of the (M−1)th layer and a number of samples of the input signal are different, unifying the number of samples in accordance with a signal with the smaller number of samples, and carrying out correlation operation on the decoded signal of the (M−1)th layer and the input signal rising part of the samples of a signal with the larger number of samples; and calculating the delay amount using a correlation result of the correlation step.

* * * * *

UNITED STATES PATENT AND TRADEMARK OFFICE

CERTIFICATE OF CORRECTION

PATENT NO. : 7,949,518 B2
APPLICATION NO. : 11/587495
DATED : May 24, 2011
INVENTOR(S) : Masahiro Oshikiri It is certified that error appears in the above-identified patent and that said Letters Patent is hereby corrected as shown below:

Title Page, Item (86), column 1, § 371 (c)(1), (2), (4) Date, incorrectly reads:
"Oct. 26, 2005"
and should read:
"Oct. 26, 2006"

Claim 9, column 22, line 11, incorrectly reads:
"rising part of the samples of a signal with the larger"
and should read:
"using part of the samples of a signal with the larger"

Signed and Sealed this
Twenty-eighth Day of February, 2012

David J. Kappos
*Director of the United States Patent and Trademark Office*